United States Patent
Mahr

(10) Patent No.: US 12,165,239 B2
(45) Date of Patent: Dec. 10, 2024

(54) METHODS AND SYSTEMS FOR GENERATING A UNIFIED TILE PYRAMID

(71) Applicant: DroneDeploy, Inc., Santa Clara, CA (US)

(72) Inventor: Daniel Eliot Mahr, Somerville, MA (US)

(73) Assignee: DRONEDEPLOY, INC., Santa Clara, CA (US)

( * ) Notice: Subject to any disclaimer, the term of this patent is extended or adjusted under 35 U.S.C. 154(b) by 164 days.

(21) Appl. No.: 17/943,916

(22) Filed: Sep. 13, 2022

(65) Prior Publication Data
US 2024/0087178 A1    Mar. 14, 2024

(51) Int. Cl.
*G06T 11/00*     (2006.01)
*G06T 3/4038*    (2024.01)
*G06T 7/38*      (2017.01)

(52) U.S. Cl.
CPC ............ *G06T 11/00* (2013.01); *G06T 3/4038* (2013.01); *G06T 7/38* (2017.01); *G06T 2207/10032* (2013.01); *G06T 2207/20016* (2013.01)

(58) Field of Classification Search
None
See application file for complete search history.

(56) References Cited

U.S. PATENT DOCUMENTS

| | | | | |
|---|---|---|---|---|
| 6,525,726 | B1* | 2/2003 | Xie | G06T 15/40 345/422 |
| 2011/0191346 | A1* | 8/2011 | Vernon | G06F 16/00 707/769 |
| 2014/0059166 | A1* | 2/2014 | Mann | H04N 21/234381 709/217 |
| 2021/0035265 | A1* | 2/2021 | Young | G09G 5/14 |
| 2024/0013485 | A1* | 1/2024 | Millin | G01C 21/00 |
| 2024/0087178 | A1* | 3/2024 | Mahr | G06T 11/00 |

OTHER PUBLICATIONS

Qiu, Linyao, et al. "An on-demand retrieval method based on hybrid nosql for multi-layer image tiles in disaster reduction visualization." ISPRS international journal of geo-information 6.1 (2017): 8. (Year: 2017).*

* cited by examiner

*Primary Examiner* — Ryan M Gray
(74) *Attorney, Agent, or Firm* — Bookoff McAndrews, PLLC

(57) ABSTRACT

A method for dynamically generating a tile of a unified tile pyramid including a set of orthomosaics captured by one or more unmanned aerial vehicles (UAVs) includes receiving, by a server and from a user device, a request for the tile of the unified tile pyramid; determining, by the server, a set of tile pyramids that overlap the tile; generating, by the server, the tile of the unified tile pyramid based on determining the set of tile pyramids; and providing, by the server and to the user device, the tile of the unified tile pyramid, wherein the user device is configured to display the tile based on receiving the tile from the server.

17 Claims, 23 Drawing Sheets

METHODS AND SYSTEMS FOR GENERATING A UNIFIED TILE PYRAMID

TECHNICAL FIELD

The present disclosure relates to methods and systems for generating a unified tile pyramid.

BACKGROUND

A tile pyramid may refer to a representation of an image in the form of levels and tiles. A "level" may refer to a version of the image that is associated with a particular resolution. For example, the image may be downsampled n times to generate n levels of the image, and each of the n levels may have a different resolution. Each level of the tile pyramid may be subdivided into a grid of "tiles." For example, a first level of the tile pyramid may be subdivided into m tiles, a second level of the tile pyramid may be subdivided into p tiles, etc. In other words, a "tile" may be a sub-image of the image.

To display a tile pyramid, a user device may request particular tiles of a particular level of the tile pyramid. A server may provide the requested tiles to the user device for display. As a user manipulates the image by panning horizontally, the user device may request additional tiles of the particular level. Moreover, as the user manipulates the image by zooming in or out to a different level of the tile pyramid, the user device may request tiles of a corresponding different level.

An unmanned aerial vehicle (UAV) may capture images of a region of interest (e.g., a building, a property, a structure, etc.). A server may generate an orthomosaic of the region of interest using the images, and may generate a tile pyramid using the orthomosaic. In this way, an entity (e.g., a business, an organization, etc.) may view the tile pyramid of the orthomosaic using a user device. Typically, a user device is configured to request a single tile pyramid from a server, and display the single tile pyramid. However, the entity may have a multitude of orthomosaics and associated tile pyramids, and might desire to concurrently view all of the orthomosaics and associated tile pyramids on a single screen. As such, a desire exists for techniques to concurrently view multiple tile pyramids.

SUMMARY

According to an embodiment of the present disclosure, a method for dynamically generating a tile of a unified tile pyramid including a set of orthomosaics captured by one or more unmanned aerial vehicles (UAVs) includes receiving, by a server and from a user device, a request for the tile of the unified tile pyramid; determining, by the server, a set of tile pyramids, corresponding to the set of orthomosaics, that overlap the tile; generating, by the server, the tile of the unified tile pyramid based on determining the set of tile pyramids; and providing, by the server and to the user device, the tile of the unified tile pyramid, wherein the user device is configured to display the tile based on receiving the tile from the server.

According to an embodiment of the present disclosure, a device for dynamically generating a tile of a unified tile pyramid including a set of orthomosaics captured by one or more unmanned aerial vehicles (UAVs) includes a memory configured to store instructions; and a processor configured to execute the instructions to perform operations comprising: receiving, from a user device, a request for the tile of the unified tile pyramid; determining a set of tile pyramids, corresponding to the set of orthomosaics, that overlap the tile; generating the tile of the unified tile pyramid based on determining the set of tile pyramids; and providing, to the user device, the tile of the unified tile pyramid, wherein the user device is configured to display the tile based on receiving the tile from the device.

According to an embodiment of the present disclosure, a non-transitory computer-readable medium stores instructions that, when executed by a processor for dynamically generating a tile of a unified tile pyramid including a set of orthomosaics captured by one or more unmanned aerial vehicles (UAVs), cause the processor to perform operations comprising: receiving, from a user device, a request for the tile of the unified tile pyramid; determining a set of tile pyramids, corresponding to the set of orthomosaics, that overlap the tile; generating the tile of the unified tile pyramid based on determining the set of tile pyramids; and providing, to the user device, the tile of the unified tile pyramid, wherein the user device is configured to display the tile based on receiving the tile from the device.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Figure 1:
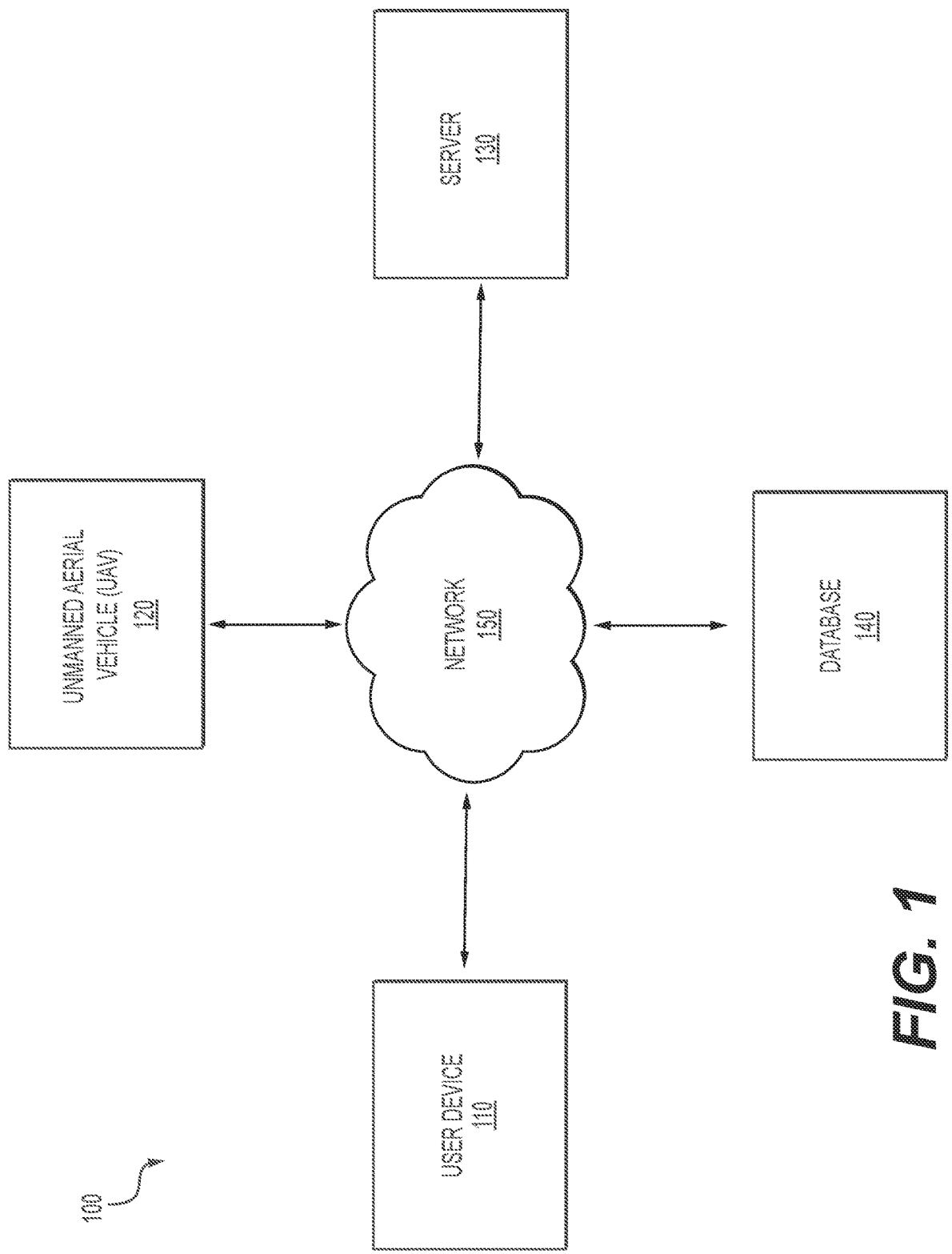
FIG. 1 is a diagram of an example system 100 for generating a unified tile pyramid.

FIG. 1 is a diagram of an example system 100 for generating a unified tile pyramid. As shown in FIG. 1, the system 100 may include a user device 110, an unmanned aerial vehicle (UAV) 120, a server 130, a database 140, and a network 150.

The user device 110 may include a device configured to display a unified tile pyramid. For example, the user device 110 may be a desktop computer, a laptop computer, a smartphone, a tablet computer, or the like. The user device 110 may be configured to execute various geographic information system (GIS) software utilizing various protocols and standards such as, for example, web map tile service (WMTS), web map service (WMS), tiled map service (TMS), web feature service (WFS), etc.

The UAV 120 (or "drone") may include a device configured to capture images of a region of interest. For example, the UAV 120 may be a multi-rotor drone, a fixed-wing drone, a single-rotor drone, a vertical take-off and landing (VTOL) drone, a satellite, or the like.

The server 130 may include a device configured to generate a unified tile pyramid. For example, the server 130 may be a server, a cloud server, a virtual machine, or the like. The server 130 may communicate with the user device 110 using any relevant protocol and/or communication standard.

The database 140 may include a device configured to store a unified tile pyramid. For example, the database 140 may be a centralized database, a distributed database, a cloud database, a network database, a hierarchical database, or the like.

The network 150 may be a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of the devices of the system 100 shown in FIG. 1 are provided as an example. In practice, the system 100 may include additional devices, fewer devices, different devices, or differently arranged devices than those shown in FIG. 1. Additionally, or alternatively, a set of devices (e.g., one or more devices) of the system 100 may perform one or more functions described as being performed by another set of devices of the system 100.

Figure 2:
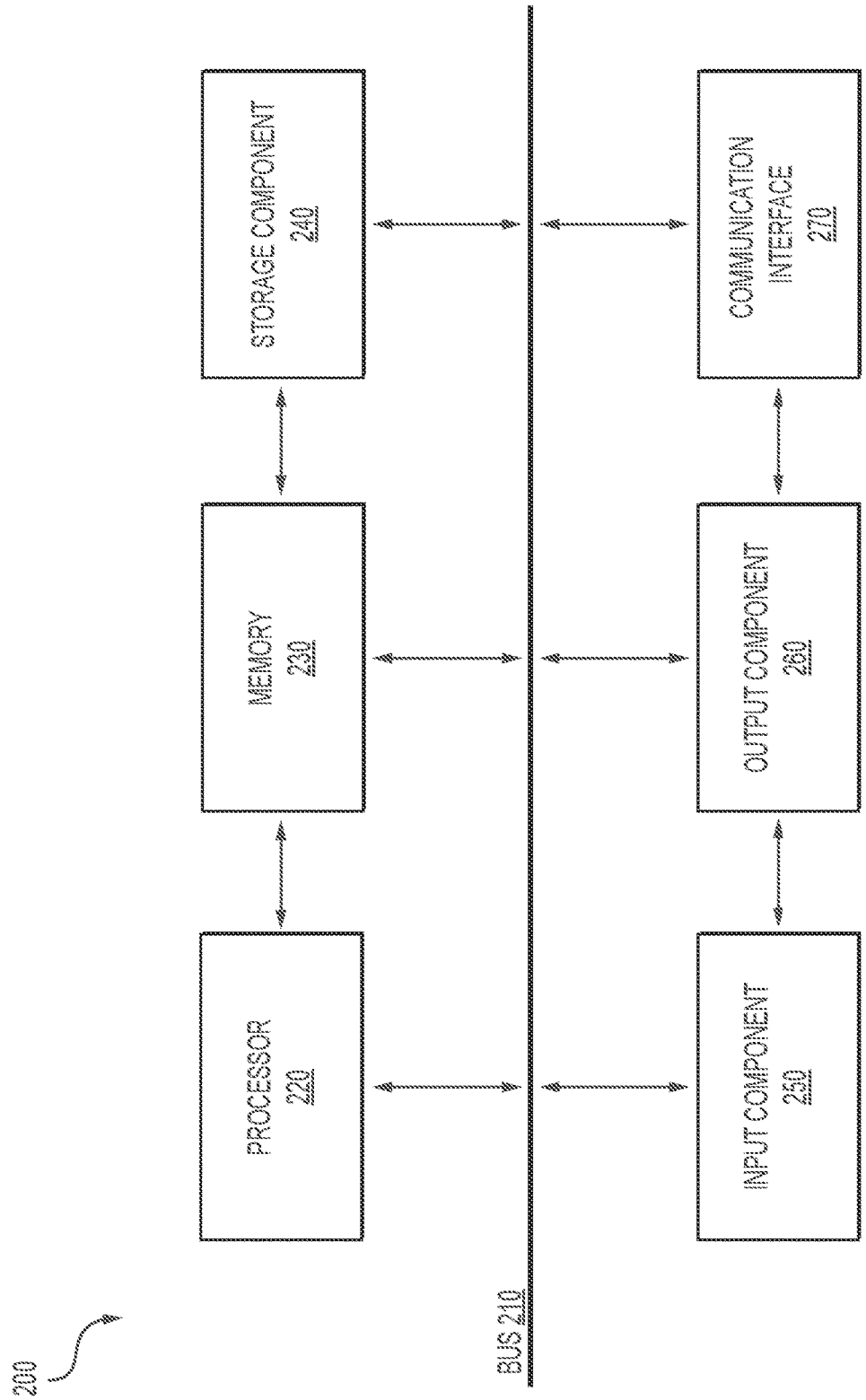
FIG. 2 is a diagram of example components of a device 200.

FIG. 2 is a diagram of example components of a device 200. The device 200 may correspond to the user device 110, the UAV 120, the server 130, and/or the database 140. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component.

The processor 220 may include one or more processors capable of being programmed to perform a function. The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, and/or a microphone for receiving the reference sound input). Additionally, or alternatively, the input component 250 may include a sensor for sensing information (e.g., a global positioning system (GPS) component, an accelerometer, a gyroscope, and/or an actuator). The output component 260 may include a component that provides output information from the device 200 (e.g., a display, a speaker for outputting sound at the output sound level, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes based on the processor 220 executing software instructions stored by a non-transitory computer-readable medium, such as the memory 230 and/or the storage component 240. A computer-readable medium may be defined herein as a non-transitory memory device. A memory device may include memory space within a single physical storage device or memory space spread across multiple physical storage devices.

The software instructions may be read into the memory 230 and/or the storage component 240 from another computer-readable medium or from another device via the communication interface 270. When executed, the software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of the components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
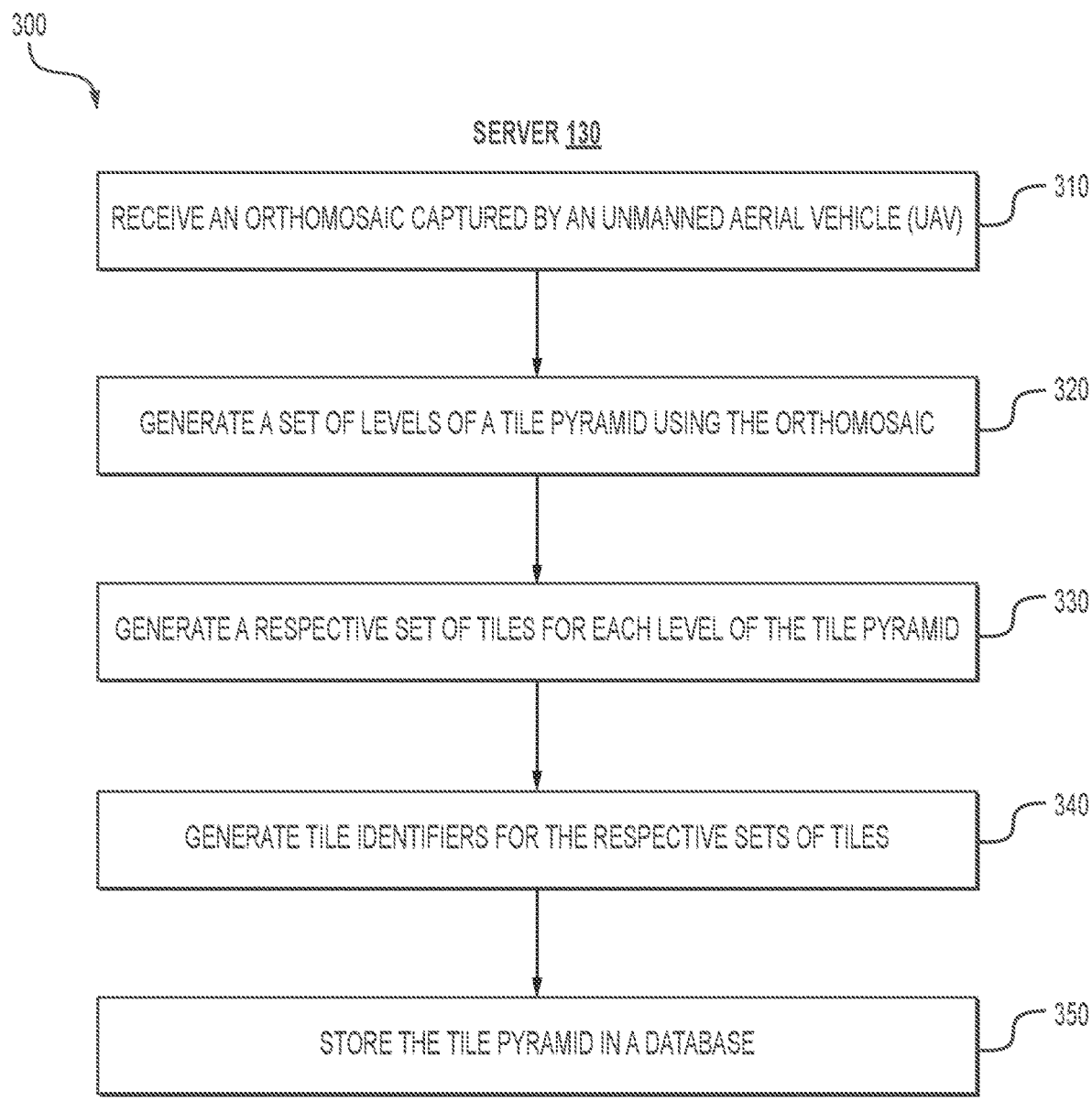
FIG. 3 is a flowchart of an example process 300 for generating a tile pyramid.

FIG. 3 is a flowchart of an example process 300 for generating a tile pyramid. FIGS. 4A-4E are diagrams of an example tile pyramid 400.

Figure 4A:
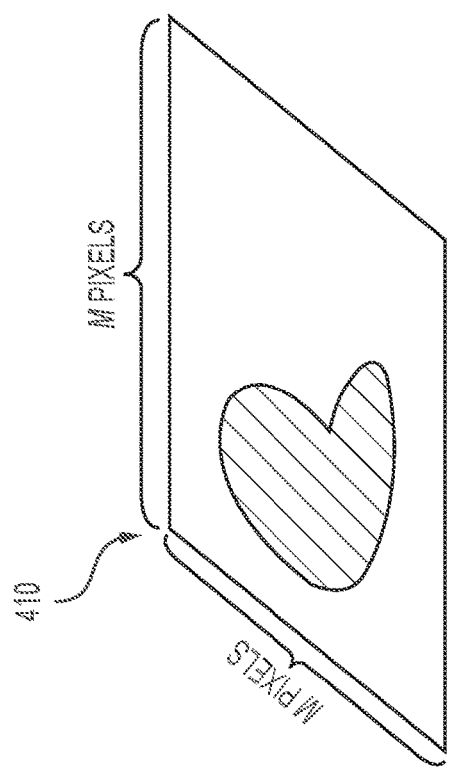
FIGS. 4A-4E are diagrams of an example tile pyramid 400.

As shown in FIG. 3, the server 130 may receive still images captured by the UAV 120 (operation 310). The UAV 120 may capture still images of a region of interest. As used herein, an "orthomosaic" may refer to an image that is generated using orthophotos. The server 130 may receive the still images, and generate the orthomosaic using photogrammetry software. Alternatively, the server 130 may receive the orthomosaic from another device that already generated the orthomosaic. As an example, and as shown in FIG. 4A, the server 130 may receive an orthomosaic 410 that includes a resolution of M pixels×M pixels.

Figure 4B:
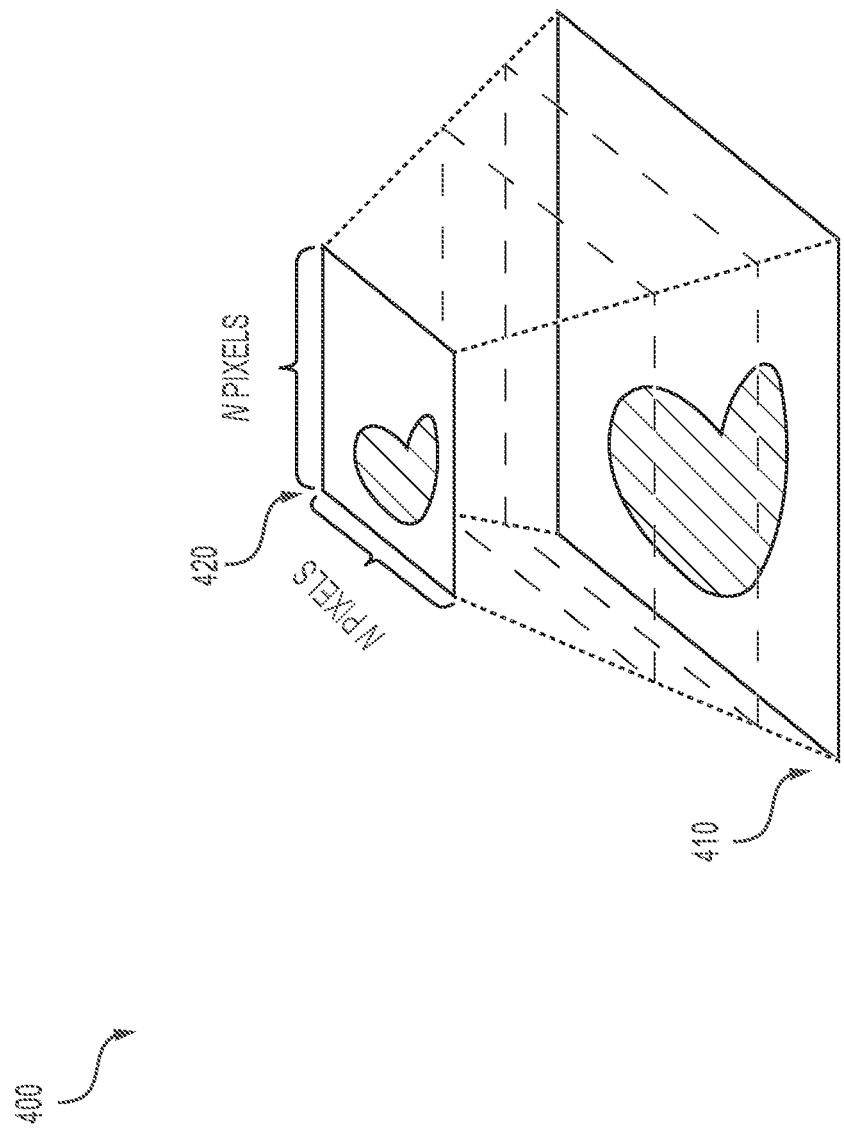

As further shown in FIG. 3, the server 130 may generate a set of levels of a tile pyramid using the orthomosaic (operation 320). For example, the server 130 may iteratively downsample the orthomosaic to generate a set of levels of the tile pyramid. As an example, and as shown in FIG. 4B, the orthomosaic 410 may be a first level of the tile pyramid 400, and the orthomosaic 420 may be an n-th level of the tile pyramid 400. As shown, the orthomosaic 420 may include a resolution of N pixels×N pixels, which is less than the resolution of the orthomosaic 410.

Figure 4C:
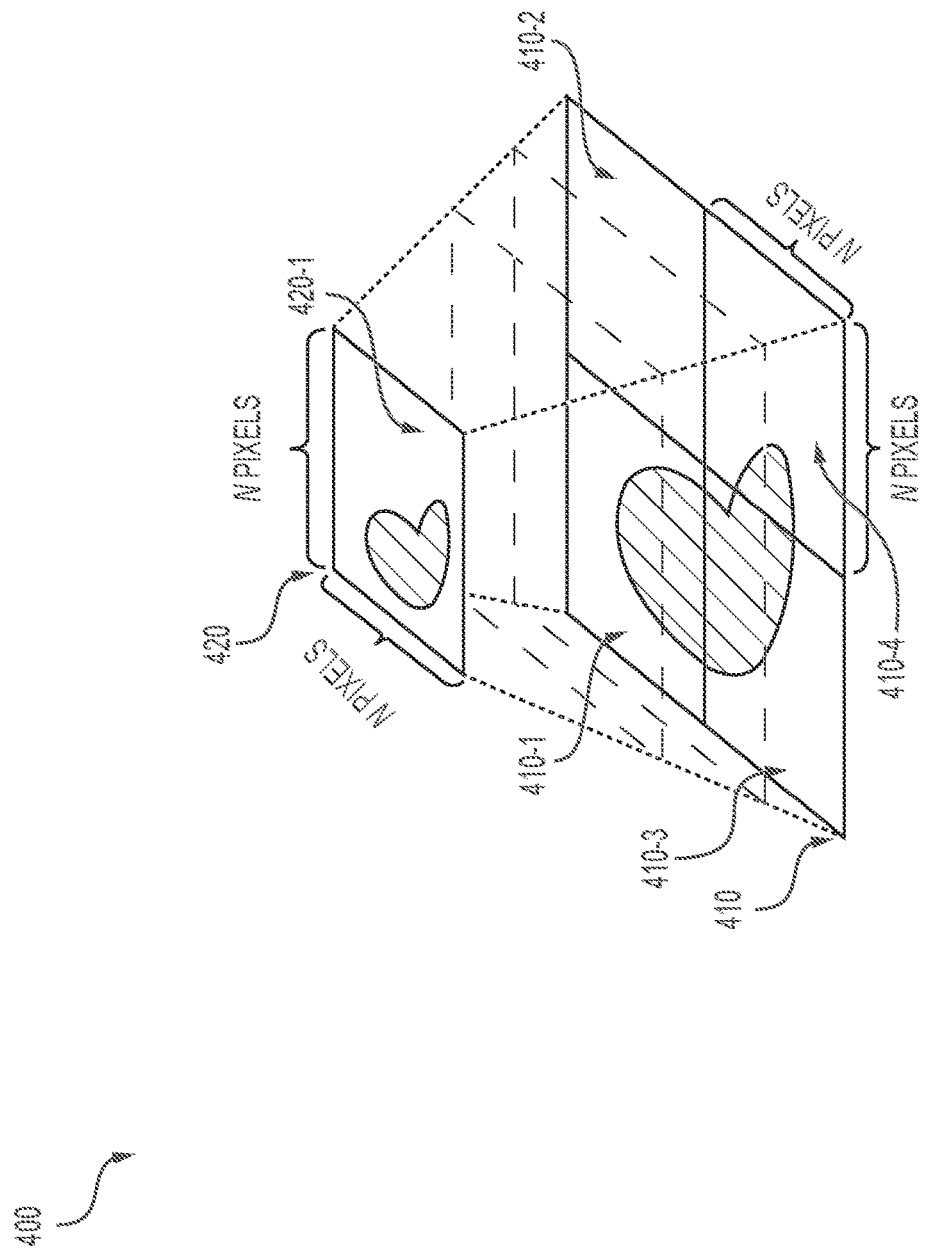

As further shown in FIG. 3, the server 130 may generate a respective set of tiles for each level of the set of levels of the tile pyramid (operation 330). For example, the server 130 may subdivide each level of the tile pyramid into a set of tiles. As an example, as shown in FIG. 4C, the orthomosaic 410 may be subdivided into a tile 410-1, a tile 410-2, a tile 410-3, and a tile 410-4. Each of the tile 410-1, the tile 410-2, the tile 410-3, and the tile 410-4 may include a resolution of N pixels×N pixels. As further shown, the orthomosaic 420 may include a tile 420-1 that includes a resolution of N pixels×N pixels.

Figure 4D:
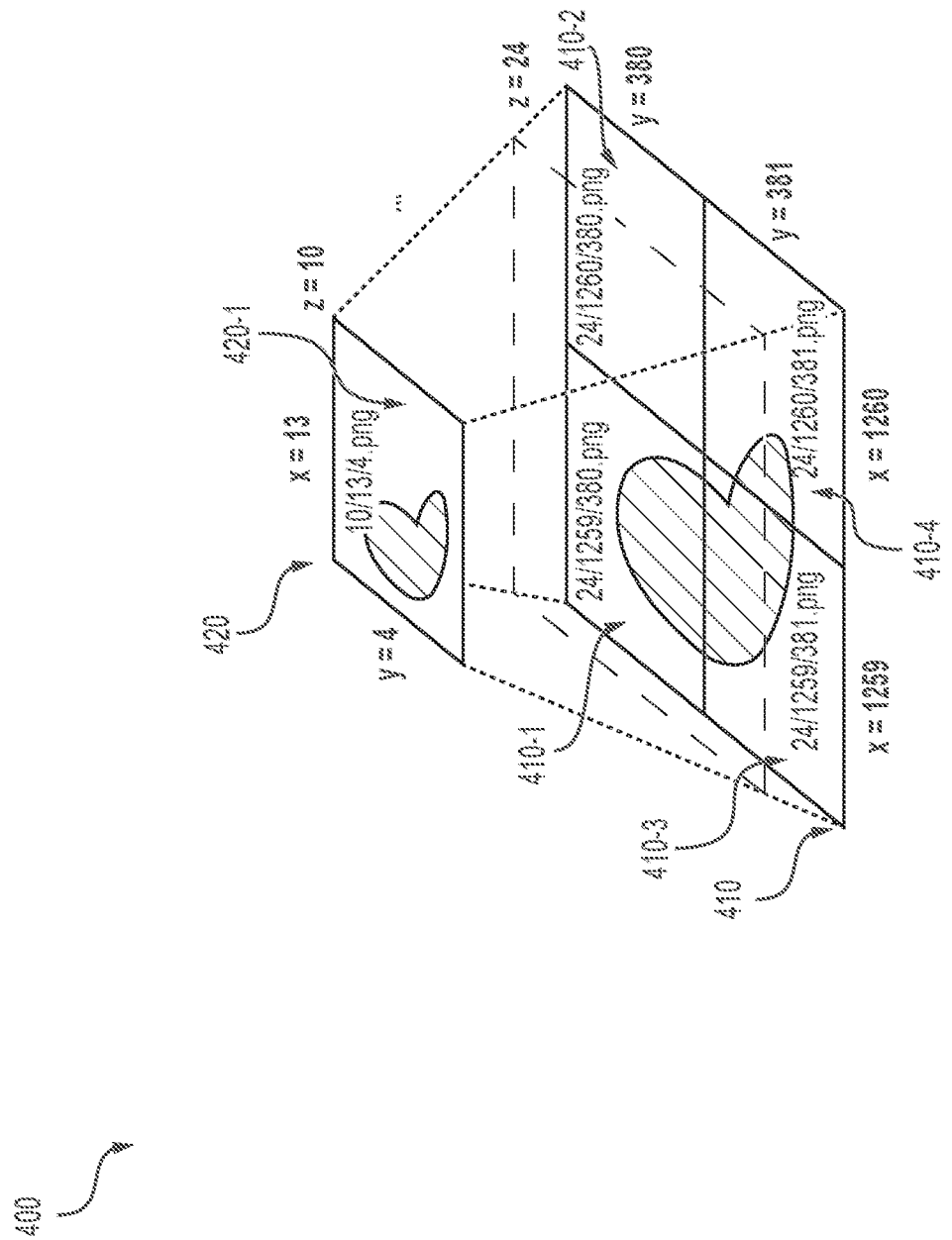

As further shown in FIG. 3, the server 130 may generate tile identifiers for the respective sets of tiles (operation 340). For example, the server 130 may generate a tile identifier for a tile that identifies a position of the tile within the tile pyramid. As an example, and as shown in FIG. 4D, the tile 410-1 may include a tile identifier that identifies a level (or zoom) value ("24"), a column value ("1259"), and a row value ("380") of the tile 410-1. The tile 410-2 may include a tile identifier that identifies a level value ("24"), a column value ("1260"), and a row value ("380") of the tile 410-2. The tile 410-3 may include a tile identifier that identifies a level value ("24"), a column value ("1259"), and a row value ("381") of the tile 410-3. The tile 410-4 may include a tile identifier that identifies a level ("24"), a column value ("1260"), and a row value ("381") of the tile 410-4. The tile 420-1 may include a tile identifier that identifies a level ("10"), a column value ("13"), and a row value ("4") of the tile 420-1.

The server 130 may generate geospatial information for a tile that identifies a geospatial position of the tile. Further, the server 130 may correlate the geospatial information for the tile with the tile identifier of the tile. The server 130 may store the tile identifier, the geospatial information, and/or the correlated geospatial information and tile identifier in the database 140. Additionally, the server 130 may generate geospatial information that identifies the geospatial footprint of the region of interest that is imaged by the orthomosaic.

Figure 4E:
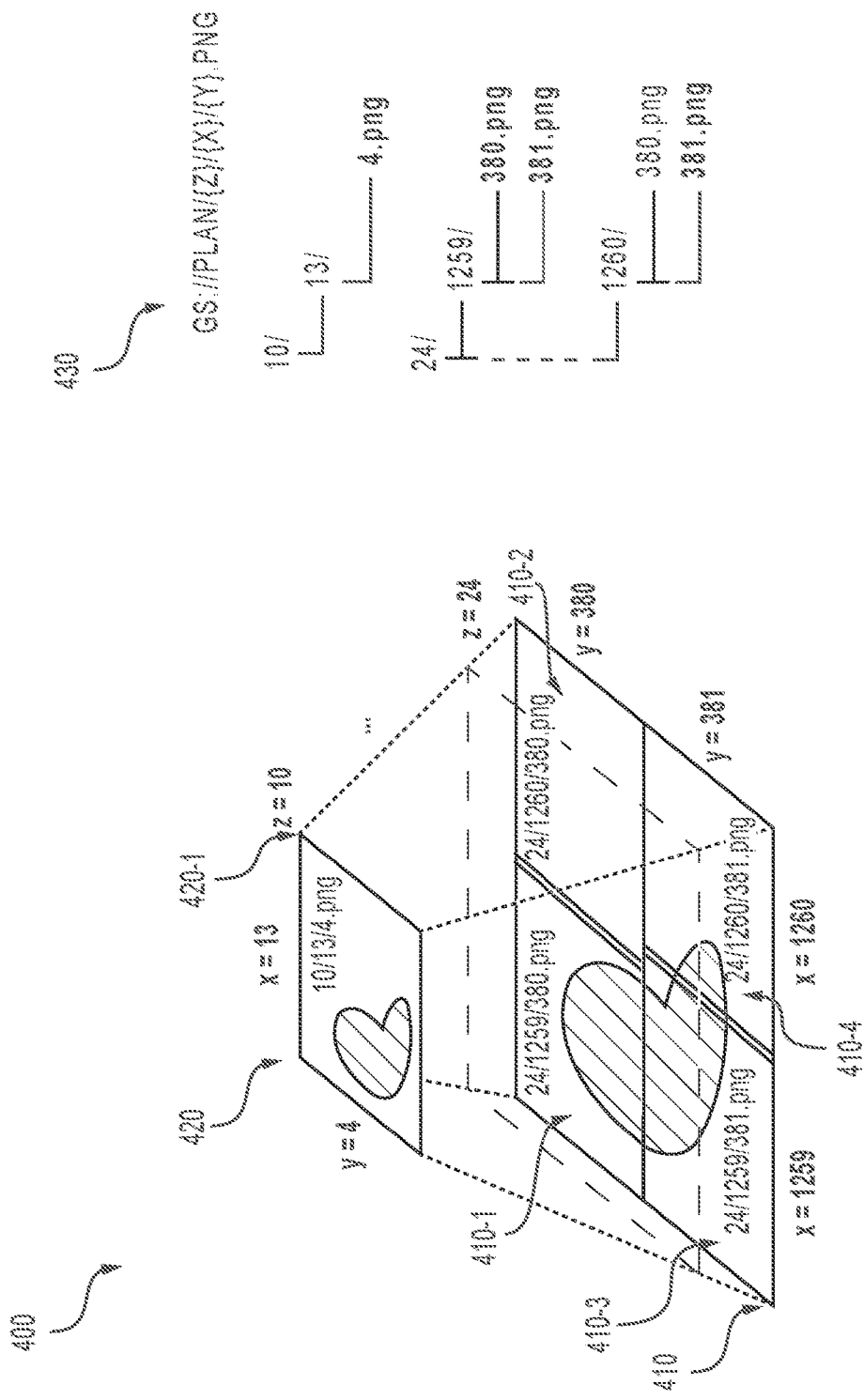

As further shown in FIG. 3, the server 130 may store the tile pyramid in the database 140 (operation 350). For example, as shown in FIG. 4E, the server 130 may store the tile pyramid in the database 140 in a file structure that is arranged by level value, column value, and row value. As shown in FIG. 4E, the tile 410-2 does not have any content. Accordingly, the file structure does not include an image corresponding to the tile 410-2.

Figure 5:
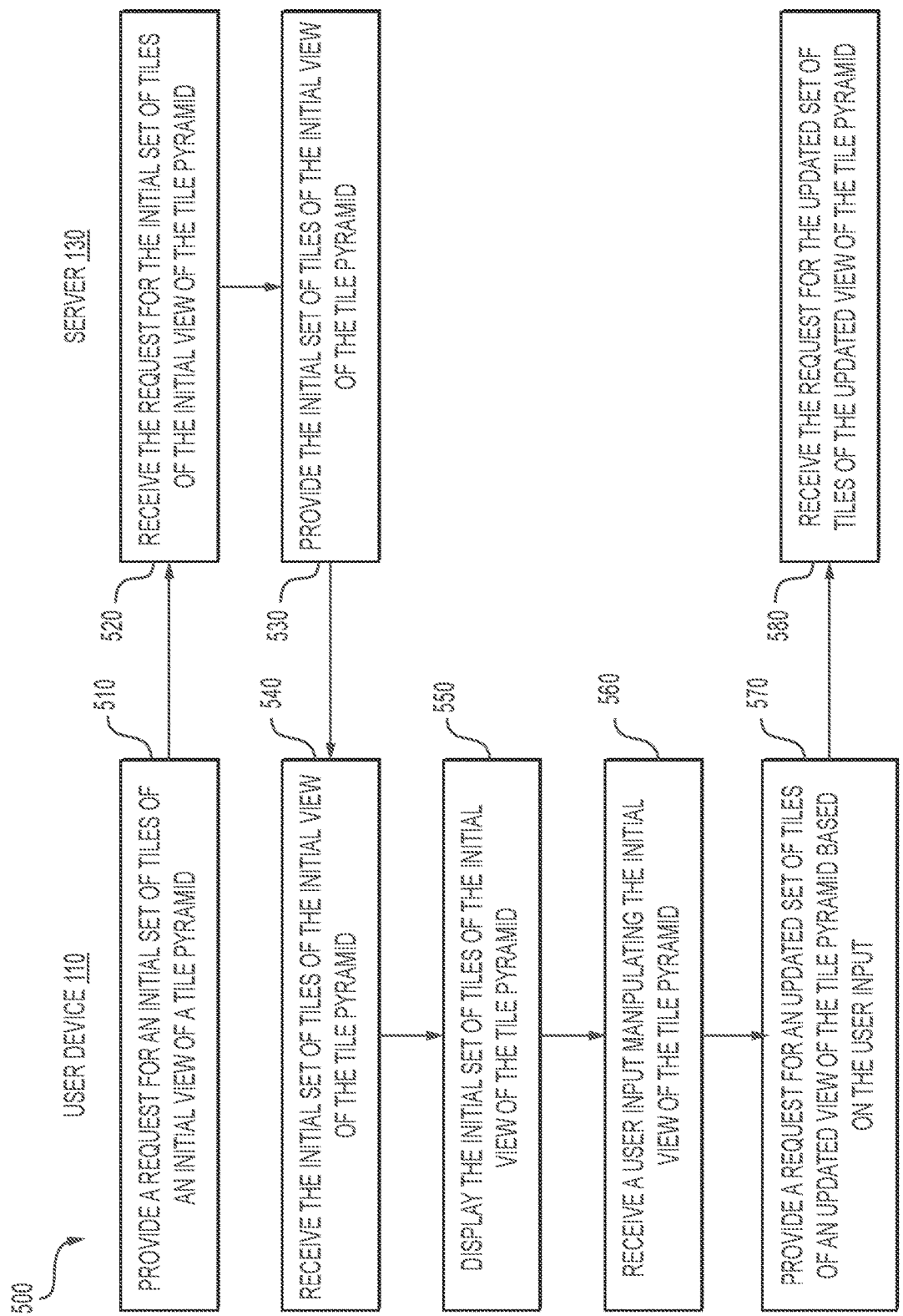
FIG. 5 is a flowchart of an example process 500 for displaying a tile pyramid.
Figure 6A:
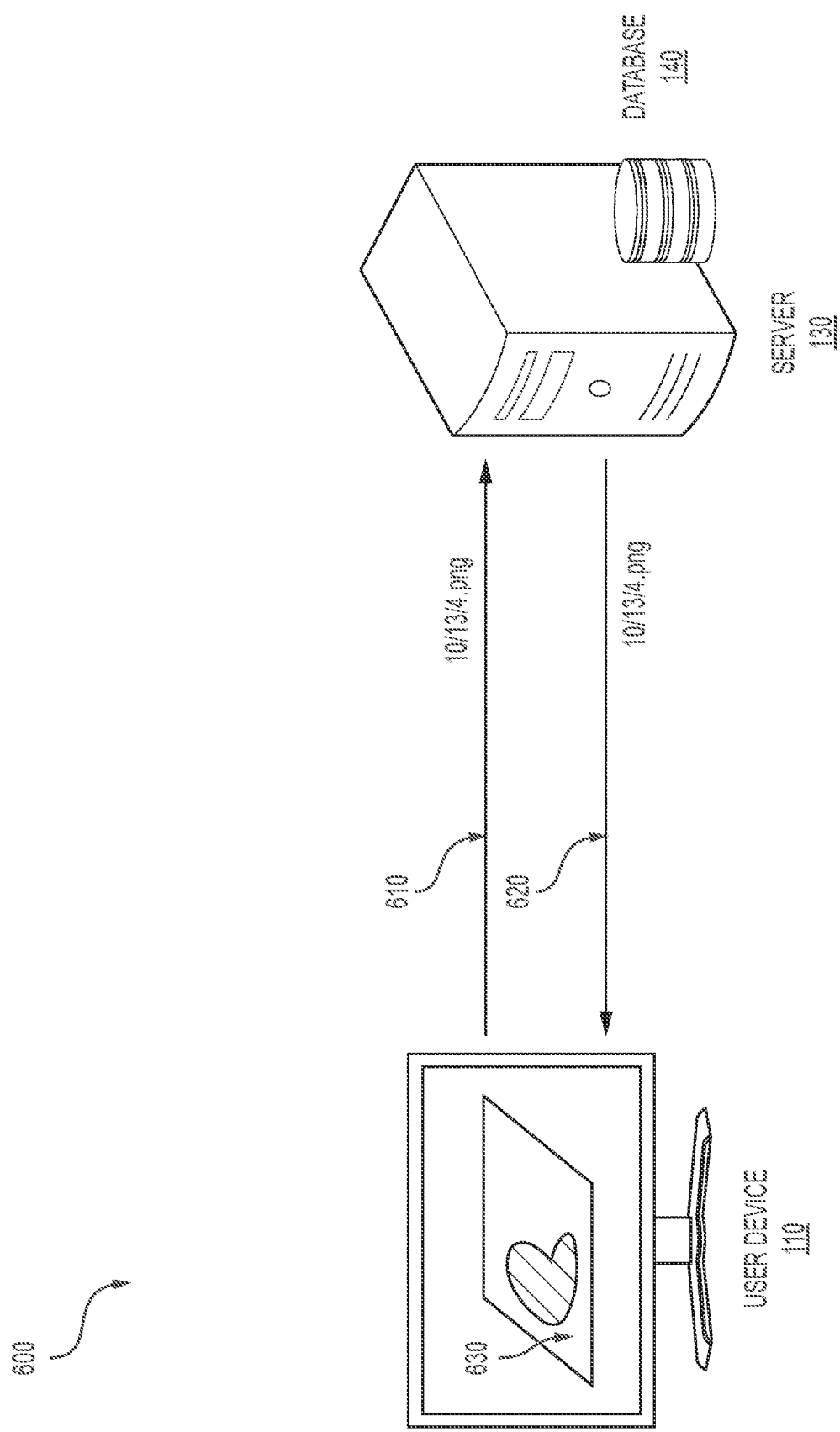
FIGS. 6A and 6B are diagrams of an example system 600 for displaying a tile pyramid.
Figure 6B:
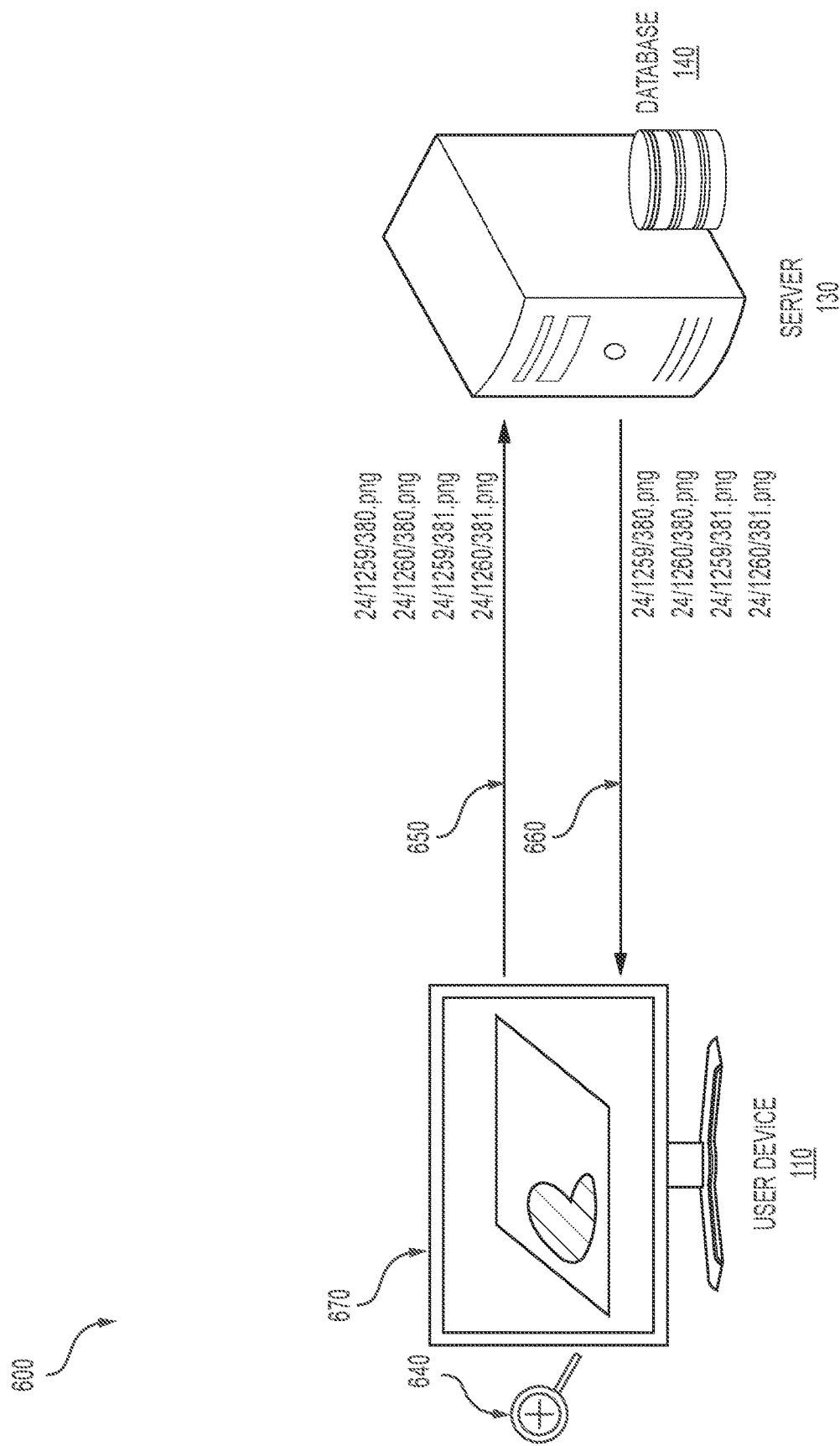

FIG. 5 is a flowchart of an example process 500 for displaying a tile pyramid. FIGS. 6A and 6B are diagrams of an example system 600 for displaying a tile pyramid.

As shown in FIG. 5, the user device 110 may provide a request for an initial set of tiles of an initial view of a tile pyramid (operation 510), and the server 130 may receive the request for the initial set of tiles of the initial view of the tile pyramid (operation 520). For example, and referring to FIG. 6A, the user device 110 may provide a request for a tile including a tile identifier of "10/13/4.png," as shown by reference number 610.

As further shown in FIG. 5, the server 130 may provide the initial set of tiles of the initial view of the tile pyramid (operation 530), and the user device 110 may receive the initial set of tiles of the initial view of the tile pyramid (operation 540). For example, and referring to FIG. 6A, the server 130 may obtain the tile from the database 140, and provide the tile to the user device 110 as shown by reference number 620.

As further shown in FIG. 5, the user device 110 may display the initial set of tiles of the initial view of the tile pyramid (operation 550). For example, as shown by reference number 630, the user device 110 may display the tile.

As further shown in FIG. 5, the user device 110 may receive a user input manipulating the initial view of the tile pyramid (operation 560), and provide a request for an updated set of tiles of an updated view of the tile pyramid based on the user input (operation 570). For example, as shown in FIG. 6B, the user device 110 may receive a user input corresponding to a zoom-in operation from the level "10" to the level "24," as shown by reference number 640. In this case, the user device 110 may provide a request for tiles including tile identifiers of "24/1259/380.png," "24/1260/380.png," "24/1259/381.png," and "24/1260/381.png," as shown by reference number 650.

As further shown in FIG. 5, the server 130 may receive the request for the updated set of tiles of the updated view of the tile pyramid (operation 580). For example, the server 130 may receive the request, obtain the tiles from the database 140, and provide the tiles to the user device 110, as shown by reference number 660. Based on receiving the tiles, the user device 110 may display the tiles, as shown by reference number 670.

Figure 7:
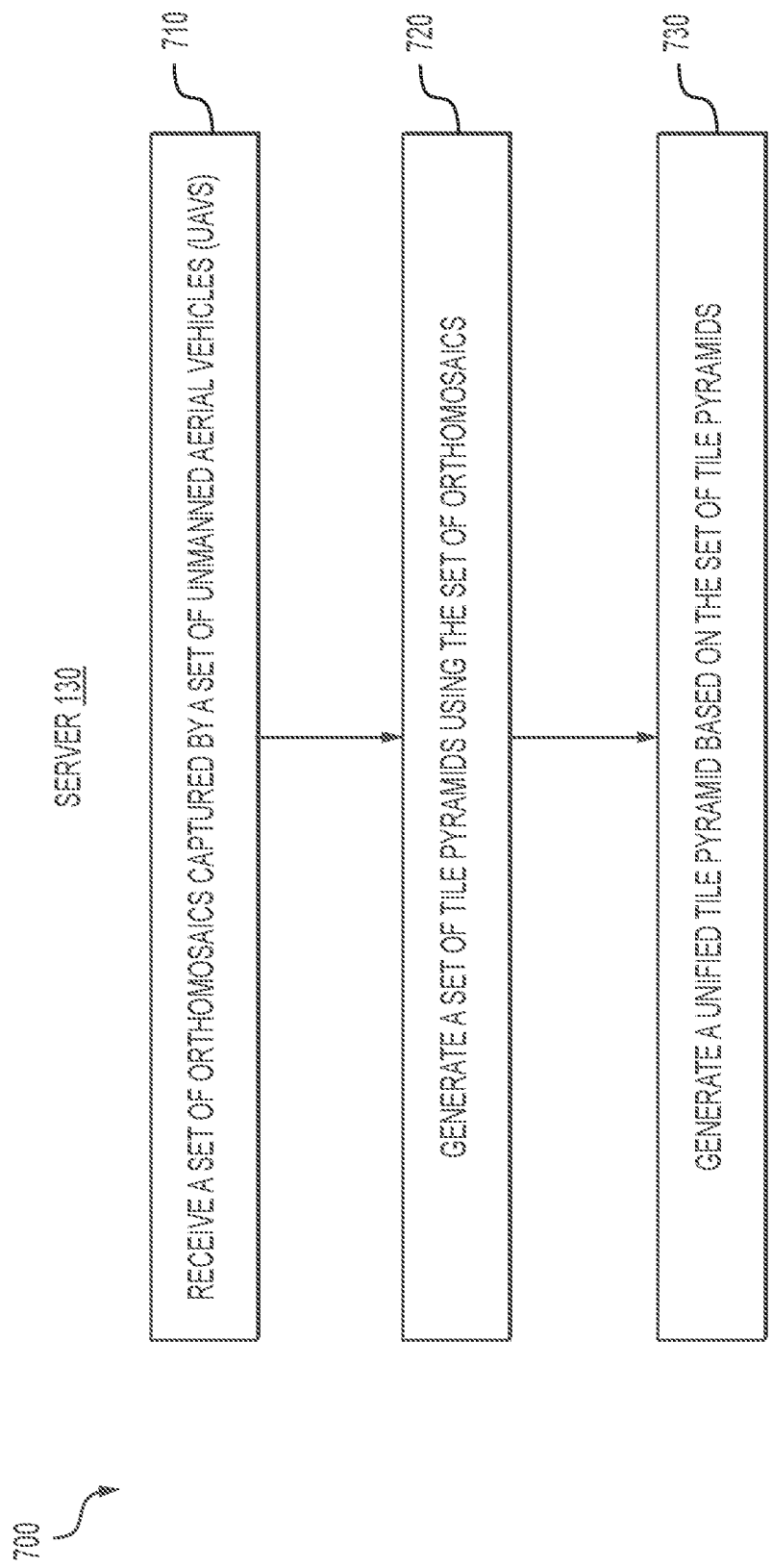
FIG. 7 is a flowchart of an example process 700 for displaying a unified tile pyramid.
Figure 8:
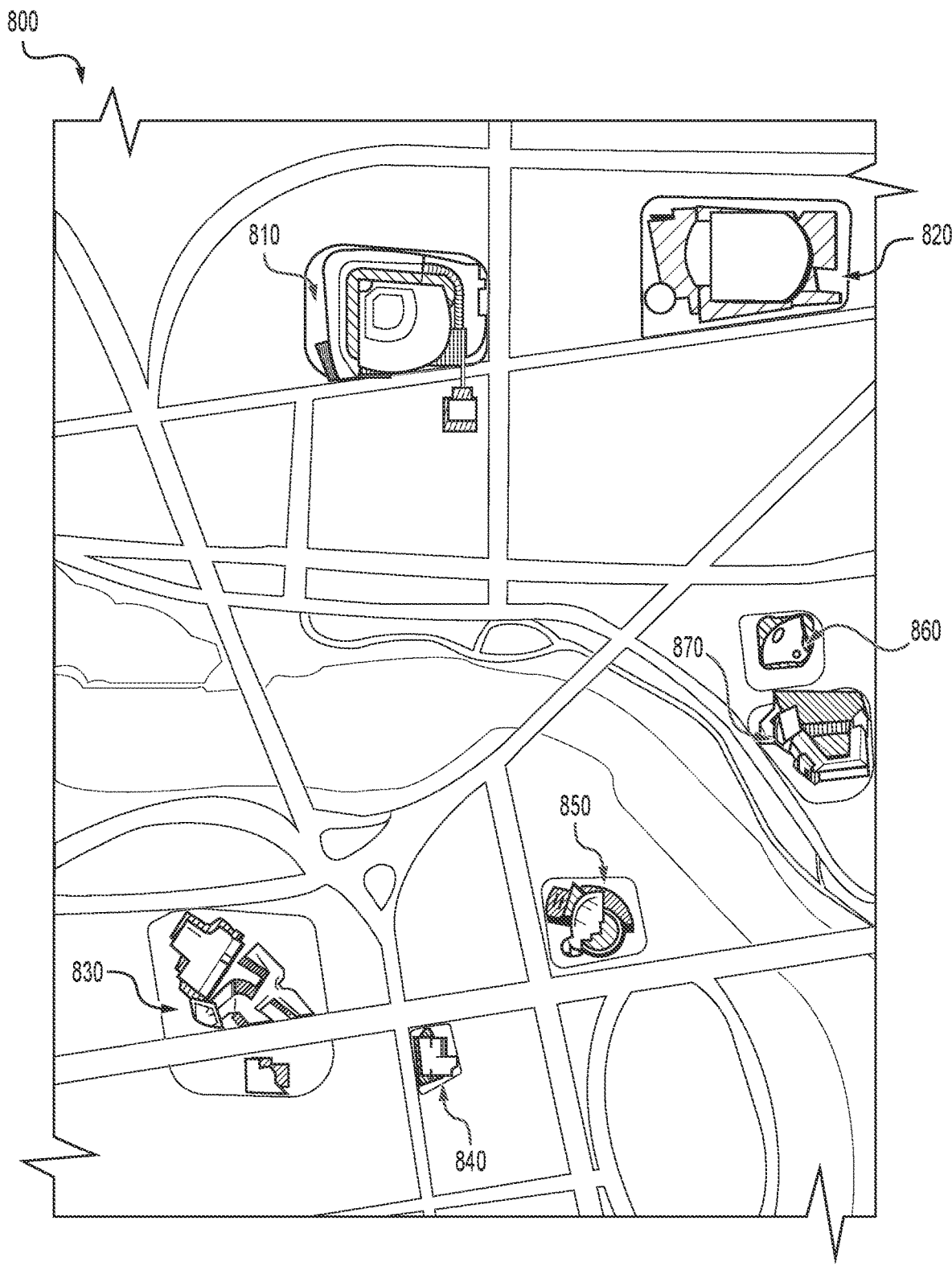
FIG. 8 is a diagram of a view 800 of a unified tile pyramid.

FIG. 7 is a flowchart of an example process 700 for displaying a unified tile pyramid. FIG. 8 is a diagram of a view 800 of a unified tile pyramid.

As shown in FIG. 7, the server 130 may receive a set of orthomosaics captured by a set of UAVs 120 (operation 710). For example, the server 130 may receive multiple orthomosaics that are associated with a particular entity (e.g., a business, a company, an organization, a group, etc.). Each orthomosaic may be associated with a temporal indicator. For example, the temporal indicator may be a time of capture of constituent images of the orthomosaic, a time of flight of the UAV(s) 120 that captured the constituent images, a time of generation of the orthomosaic, or the like.

As further shown in in FIG. 7, the server 130 may generate a set of tile pyramids using the set of orthomosaics (operation 720). For example, the server 130 may generate a tile pyramid for each orthomosaic in a similar manner as described above in connection with FIG. 3.

As further shown in FIG. 7, the server 130 may generate a unified tile pyramid based on the set of tile pyramids (operation 730). For example, the server 130 may generate a unified tile pyramid by aggregating the tile pyramids into a format such that the tile pyramids may be requested and concurrently viewed on a single screen. For example, the user device 110 may request tiles of the unified tile pyramid, and display the unified tile pyramid to concurrently display each of the constituent tile pyramids in a single "view." For instance, as shown in FIG. 8, the user device 110 may display a view 800 of a unified tile pyramid that includes constituent tile pyramids 810-870. In this way, the user device 110 may concurrently display all (or multiple) of the tile pyramids of an entity in the form of a "unified tile pyramid," such that a user may view each of the tile pyramids in a single "view." Moreover, the user may manipulate the view of the unified tile pyramid to view each respective tile pyramid.

Figure 9:
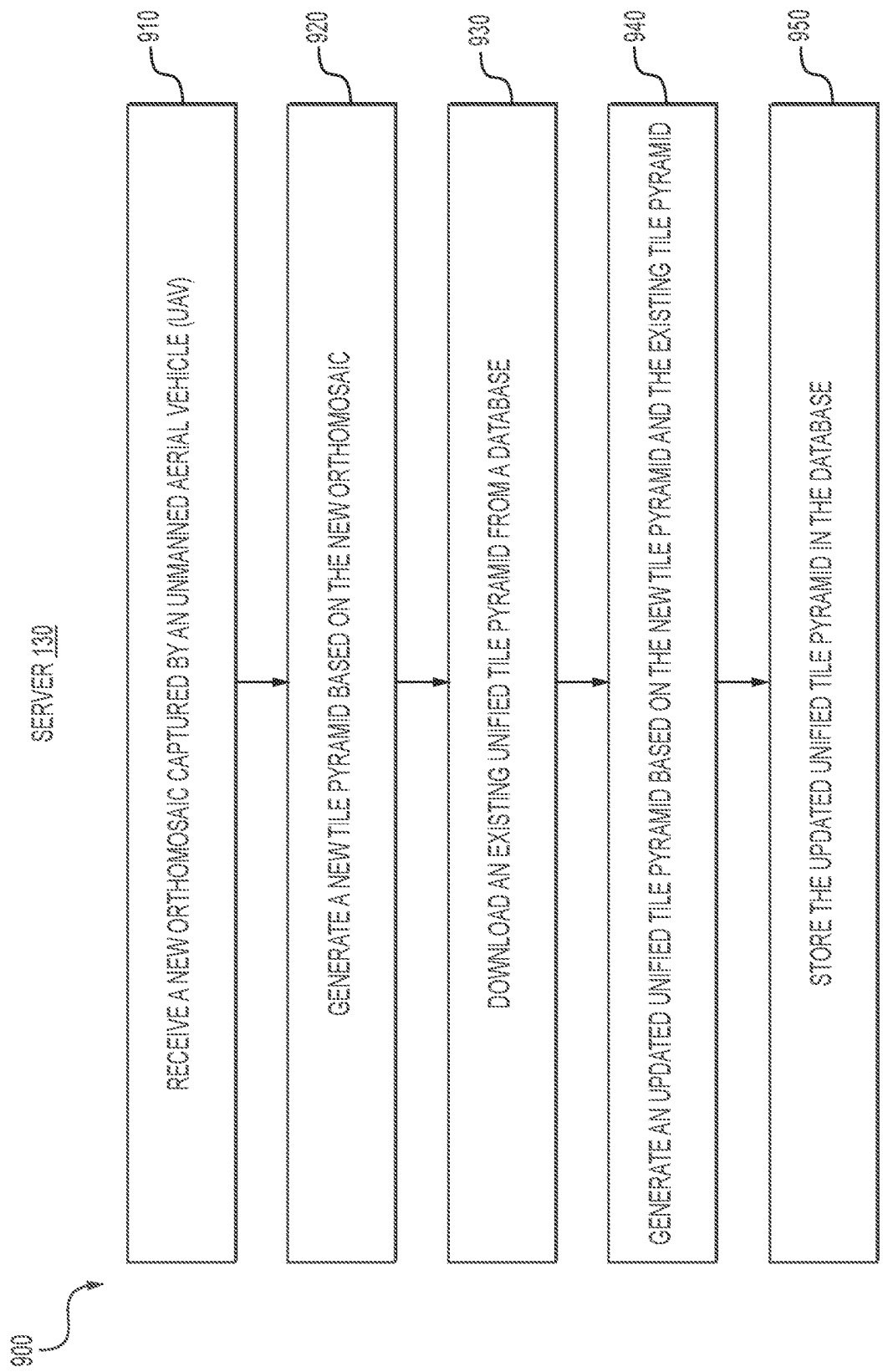
FIG. 9 is a flowchart of an example process 900 for generating an updated unified tile pyramid.
Figure 10:
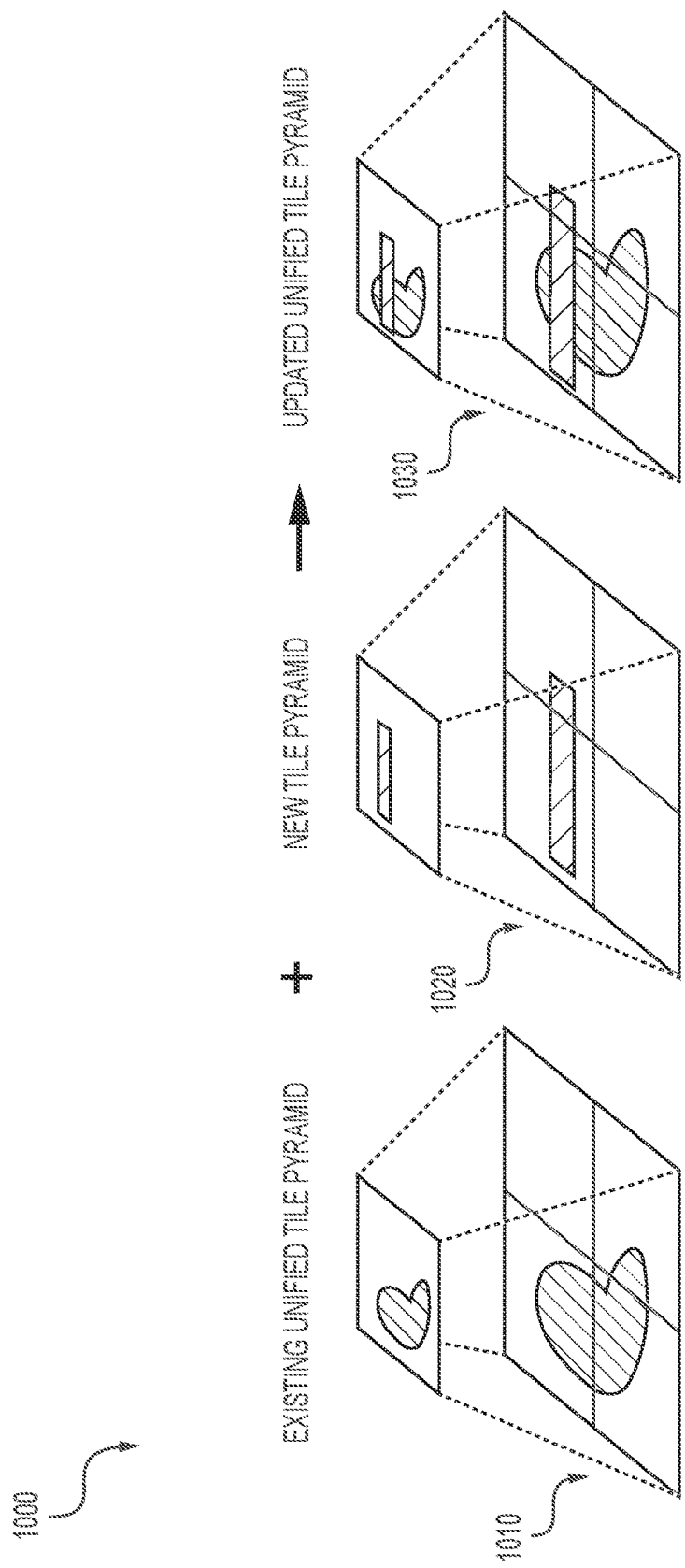
FIG. 10 is a diagram of an example process 1000 for generating an updated unified tile pyramid.

FIG. 9 is a flowchart of an example process 900 for generating an updated unified tile pyramid. FIG. 10 is a diagram of an example process 1000 for generating an updated unified tile pyramid.

As shown in FIG. 9, the server 130 may receive a new orthomosaic captured by a UAV 120 (operation 910). For example, the server 130 may receive an orthomosaic that includes a temporal indicator that indicates that the orthomosaic is more current than an existing unified tile pyramid 1010, as shown in FIG. 10.

As further shown in FIG. 9, the server 130 may generate a new tile pyramid based on the new orthomosaic (operation 920). For example, the server may generate a new tile pyramid 1020, as shown in FIG. 10, based on the new orthomosaic in a similar manner as described above in connection with FIG. 3.

As further shown in FIG. 9, the server 130 may download an existing unified tile pyramid from the database 140 (operation 930). For example, the server 130 may download an existing unified tile pyramid 1010 from the database 140. The existing unified tile pyramid 1010 may be a tile pyramid that includes one or more constituent tile pyramids.

As further shown in FIG. 9, the server 130 may generate an updated unified tile pyramid based on the new tile pyramid and the existing tile pyramid (operation 940). For example, the server 130 may overlay the new tile pyramid 1020 on the existing unified tile pyramid 1010 to generate an updated unified tile pyramid 1030, as shown in FIG. 10. In this way, images of the new tile pyramid 1020 occludes the same underlying images of the existing unified tile pyramid 1010.

As further shown in FIG. 9, the server 130 may store the updated unified tile pyramid in the database 140 (operation 950). For example, the server 130 may store the updated unified tile pyramid 1030 in the database 140.

In this way, the server 130 may generate a unified tile pyramid using orthomosaics of an entity, and store the unified tile pyramid in the database 140. If the entity desires to add a new orthomosaic to the unified tile pyramid, the server 130 may download all of the tiles of the existing unified tile pyramid from the database 140, overlay the new tiles of the new orthomosaic on the existing tiles of the existing unified tile pyramid, and upload the newly-generated tiles to the database 140. In this case, the server 130 may be required to download all of the existing tiles of the existing unified tile pyramid, which thereby consumes processor and memory resources of the server 130 and the database 140, consumes bandwidth resources, and increases processing time.

To address the foregoing, and as described above in more detail below in connection with FIG. 11, the present disclosure provides a mechanism that reduces the number of existing tiles of the existing unified tile pyramid that are downloaded by the server 130 to generate the updated unified tile pyramid. In this way, the present disclosure conserves processor and memory resources of the server 130 and the database 140, more efficiently downloads tiles of the existing unified tile pyramid, reduces consumption of bandwidth resources, and reduces processing time.

Figure 11:
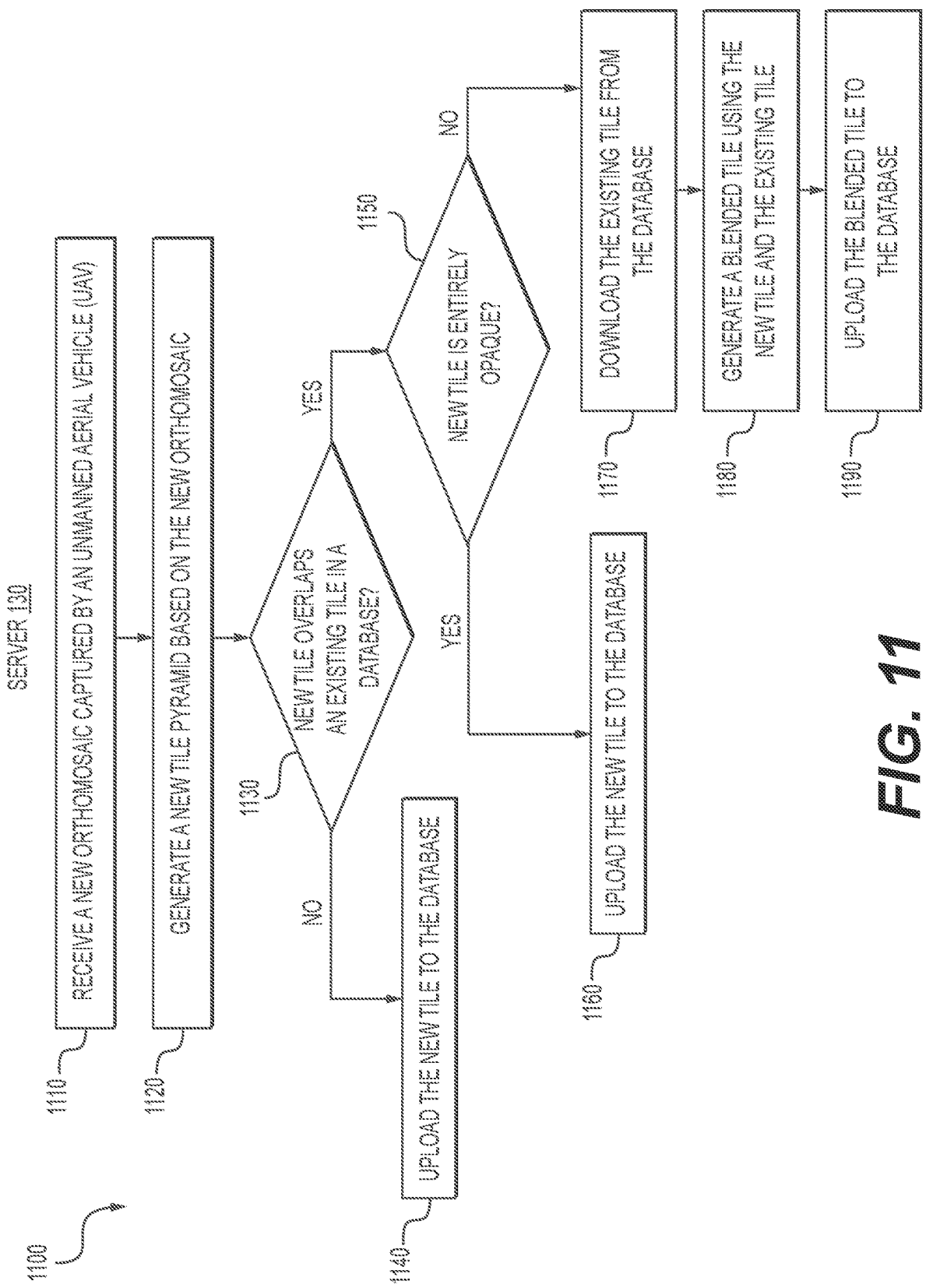
FIG. 11 is a flowchart of an example process 1100 for generating an updated unified tile pyramid.
Figure 12:
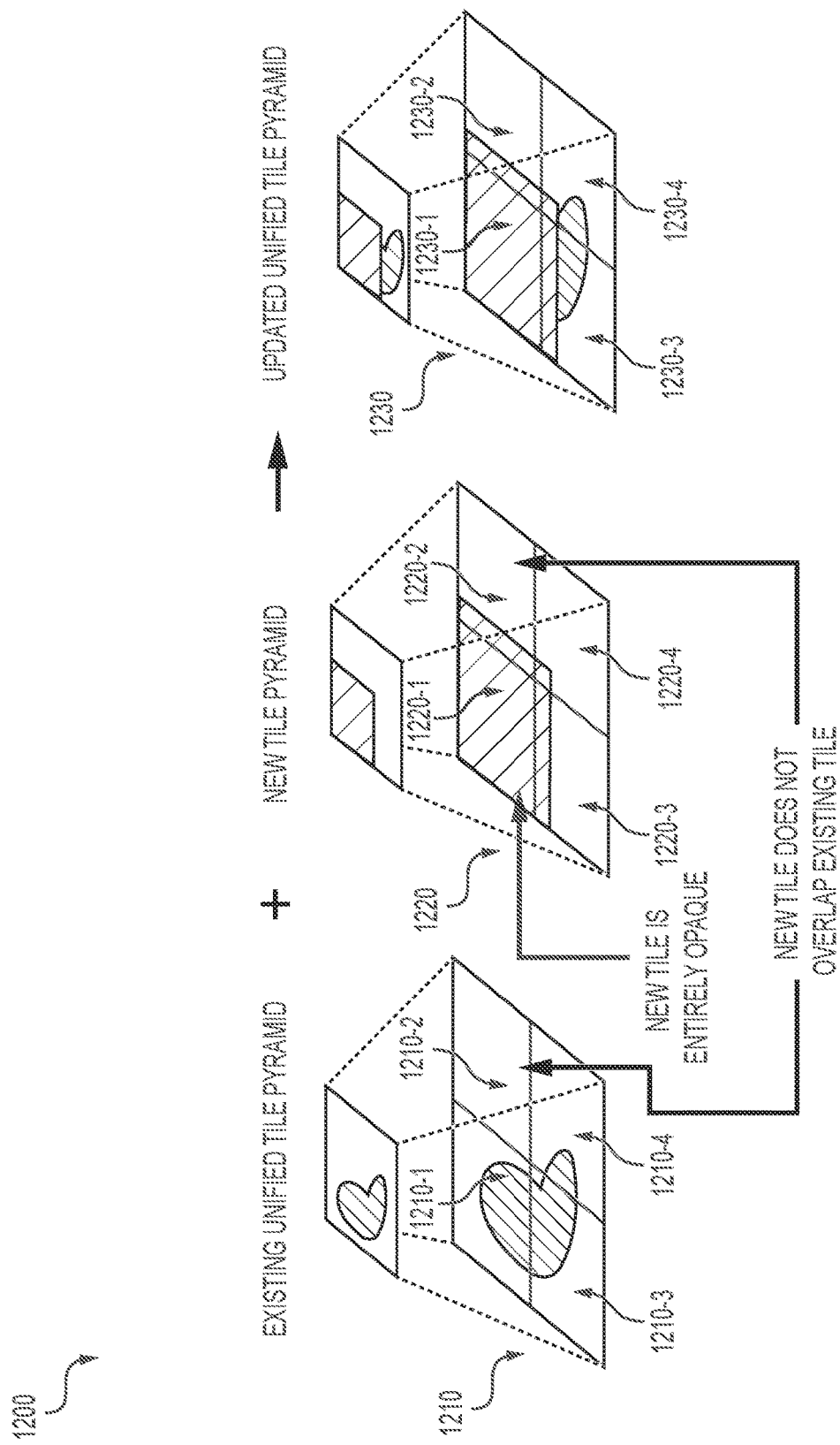
FIG. 12 is a diagram of an example process 1200 for generating an updated unified tile pyramid.

FIG. 11 is a flowchart of an example process 1100 for generating an updated unified tile pyramid. FIG. 12 is a diagram of an example process 1200 for generating an updated unified tile pyramid.

As shown in FIG. 11, the server 130 may receive a new orthomosaic captured by a UAV 120 (operation 1110), and generate a new tile pyramid based on the new orthomosaic (operation 1120). For example, the server 130 may generate a new tile pyramid in a similar manner as described above in connection with FIG. 3.

As further shown in FIG. 11, and for each new tile of the new tile pyramid, the server 130 may determine whether the new tile overlaps an existing tile of an existing tile pyramid stored in the database 140 (operation 1130). For example, the server 130 may determine a tile identifier of the new tile and/or geospatial information of the new tile, and determine whether an existing tile having a corresponding tile identifier and/or corresponding geospatial information is stored in the database 140. If the server 130 determines that an existing tile having a corresponding tile identifier or corresponding geospatial information is not stored in the database, then the server 130 determines that the new tile does not overlap an existing tile stored in the database 140. Alternatively, if the server 130 determines that an existing tile having a corresponding tile identifier or corresponding geospatial information is stored in the database 140, then the server 130 determines that the new tile does overlap an existing tile stored in the database 140.

As further shown in FIG. 11, if the new tile does not overlap an existing tile of the existing tile pyramid stored in the database 140 (operation 1130—NO), then the server 130 may upload the new tile to the database 140 (operation 1140). For example, if the server 130 determines that the new tile does not overlap an existing tile, then the server 130 may upload the new tile to the database 140 without downloading an existing tile having the corresponding tile identifier or corresponding geospatial information because an existing tile having the corresponding tile identifier or corresponding geospatial information does not exist. As an example, and as shown in FIG. 12, the server 130 determines that the new tile 1220-2 of the new tile pyramid 1220 does not overlap an existing tile of an existing tile pyramid 1210 because the existing tile pyramid 1210 does not include a tile having a corresponding tile identifier or corresponding geospatial information to the new tile 1220-2. In this case, the server 130 uploads the new tile 1220-2 (which is the same as tile 1230-2) to the database 140 without downloading an existing tile having a corresponding tile identifier from the database 140.

As further shown in FIG. 11, if the tile does overlap an existing tile of the existing tile pyramid stored in the database 140 (operation 1130—YES), then the server 130 may determine whether the new tile is entirely opaque (operation 1150). For example, if the server 130 determines that the new tile does overlap an existing tile, then the server 130 determines whether the new tile is entirely opaque. The server 130 may determine whether the new tile is entirely opaque based on opacity values of constituent pixels of the new tile. If all (or greater than a threshold amount) of the constituent pixels have non-zero opacity values, then the server 130 may determine that the new tile is entirely opaque. Alternatively, if less than all (or less than a threshold amount) of constituent pixels have non-zero opacity values, then the server 130 may determine that the new tile is not entirely opaque.

As further shown in FIG. 11, if the new tile is entirely opaque (operation 1150—YES), then the server 130 may upload the new tile to the database 140. For example, if the new tile is entirely opaque, then the server 130 may upload the new tile to the database 140 without downloading an existing tile having a corresponding tile identifier or corresponding geospatial information from the database 140 because the new tile will entirely occlude the existing tile, which thereby renders the download of the existing tile unnecessary. For example, as shown in FIG. 12, the server 130 may determine that the new tile 1220-1 is entirely opaque. In this case, the server 130 may upload the new tile 1220-1 (which is the same as the tile 1230-1) to the database 140 without downloading the existing tile 1210-1 of the existing tile pyramid 1210 because the new tile 1220-1 will occlude the existing tile 1210-1.

As further shown in FIG. 11, if the new tile is not entirely opaque (operation 1150—NO), then the server 130 may download the existing tile from the database 140 (operation 1170), generate a blended tile using the new tile and the existing tile (operation 1180), and upload the blended tile to the database 140 (operation 1190). For example, if the new tile is not entirely opaque, then the server 130 may download an existing tile from the database 140, blend the new tile and the existing tile using a blending technique (e.g., alpha compositing, alpha blending, or the like), and upload the blended tile to the database 140. As an example, as shown in FIG. 12, the server 130 may download the existing tile 1210-3 from the database 140, blend the new tile 1220-3 and the existing tile 1210-3, and upload the blended tile 1230-3 to the database 140. Also, an example, the server 130 may download the existing tile 1210-4 from the database 140, blend the new tile 1220-4 and the existing tile 1210-4, and upload the blended tile 1230-4 to the database 140.

By the foregoing operations, the server 130 may reduce the number of existing tiles that are downloaded from the database 140 when generating or updating a unified tile pyramid, which thereby conserves processor and memory resources of the server 130 and the database 140, reduces consumption of bandwidth resources, and reduces processing time.

Figure 13:
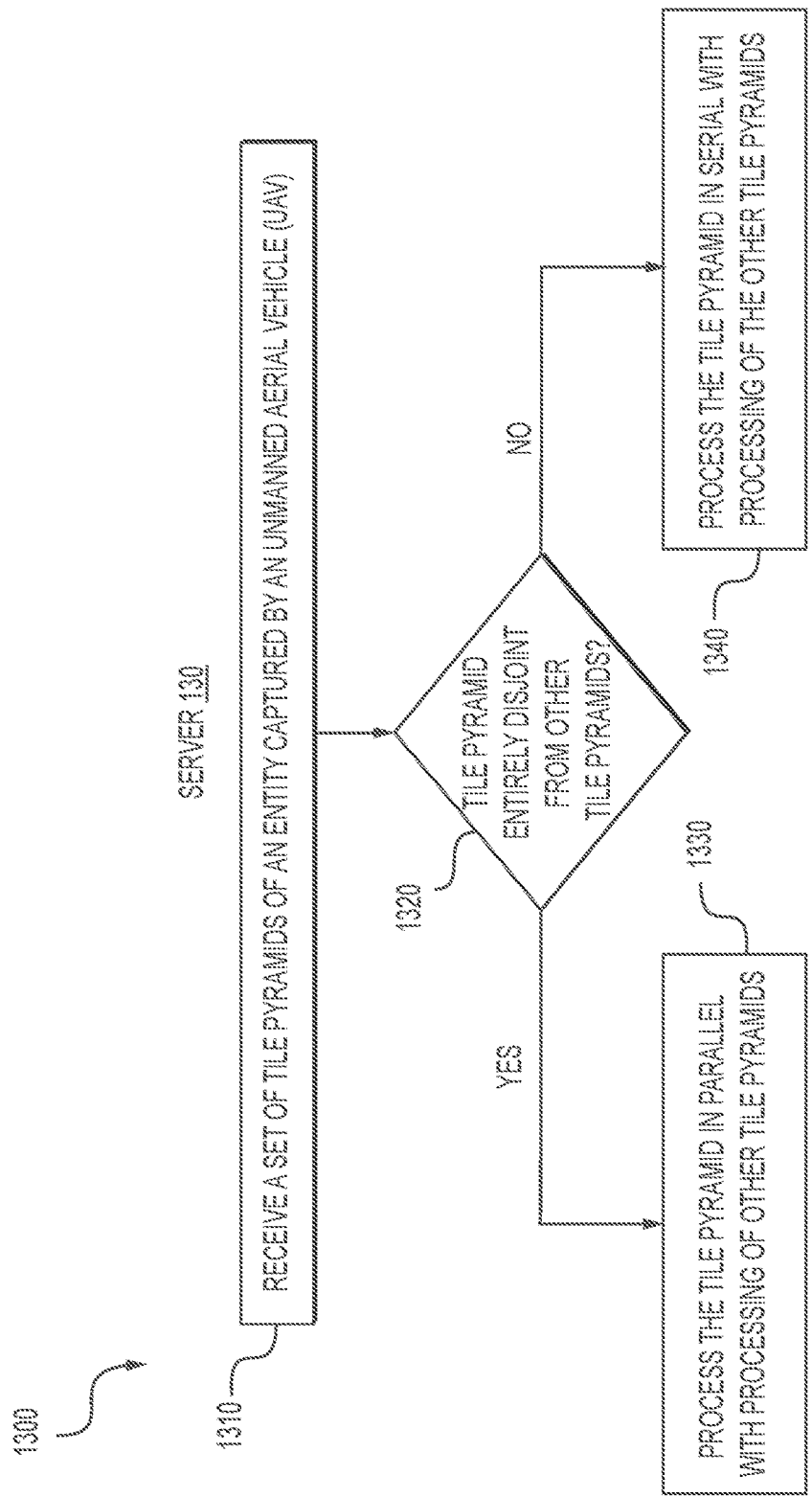
FIG. 13 is a flowchart of an example process 1300 for processing tile pyramids when generating a unified tile pyramid.
Figure 14:
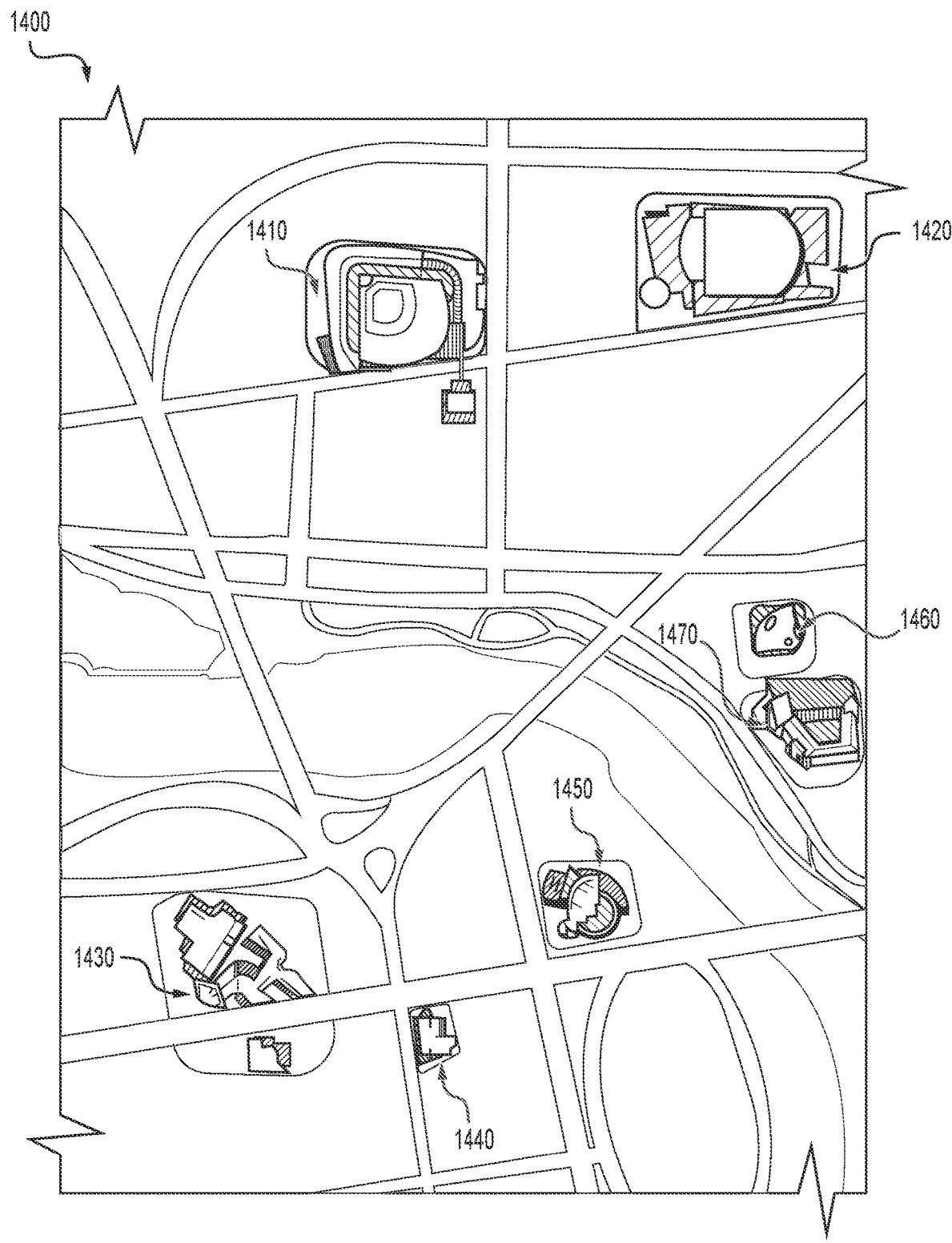
FIG. 14 is a diagram of a view 1400 of a unified tile pyramid.

FIG. 13 is a diagram of an example flowchart 1300 for processing tile pyramids when generating a unified tile pyramid. FIG. 14 is a diagram of a view 1400 of a unified tile pyramid.

An entity might have a large number of tile pyramids, and may desire to generate a unified tile pyramid including the tile pyramids. In this case, the server 130 might process each tile pyramid in serial based on the temporal indicators of the tile pyramids. However, by processing each tile pyramid serially, the server 130 might increase processing time and delay in providing the unified tile pyramid to the user device 110.

Accordingly, the present disclosure provides a mechanism by which the server 130 may process some, or all, of the constituent tile pyramids of the unified tile pyramid in parallel based on whether the tile pyramids are entirely spatially disjoint from other tile pyramids. In this way, the server 130 may reduce processing time while avoiding visual inconsistencies.

As shown in FIG. 13, the server 130 may receive a set of tile pyramids of an entity captured by a UAV 120 (1310). For example, the server 130 may receive tile pyramids of an entity (e.g., business, corporation, etc.) in a similar manner as described in connection with FIG. 3.

As further shown in FIG. 13, the server 130 may determine whether a tile pyramid, of the set of tile pyramids, is entirely disjoint from the other tile pyramids of the set of tile pyramids (operation 1320). For example, and for each tile pyramid, the server 130 may determine whether the tile pyramid overlaps with any of the other tile pyramids. The server 130 may compare geospatial information of the tile pyramid with geospatial information of the other tile pyramids, and determine whether the tile pyramid is entirely disjoint from the other tile pyramids based on comparing the geospatial information.

As further shown in FIG. 13, if the tile pyramid is entirely disjoint from all of the other tile pyramids (operation 1320—YES), then the server 130 may process the tile pyramid in parallel with processing of other tile pyramids. For example, the server 130 may generate tile identifiers for the tiles of the tile pyramid, and upload the tile pyramid to the database 140 in parallel with processing of other tile pyramids. As an example, and referring to FIG. 14, the server 130 may process the tile pyramids 1410, 1420, 1430, 1440, and 1450 in parallel because the tile pyramids 1410, 1420, 1430, 1440, and 1450 are entirely disjoint from other tile pyramids.

As further shown in FIG. 13, if the tile pyramid is not entirely disjoint from all of the other tile pyramids (operation 1320—NO), then the server 130 may process the tile pyramid in serial with processing of the other tile pyramids. For example, the server 130 may generate tile identifiers for the tiles of the tile pyramid, and may process the new tile pyramid and the existing tile pyramid in a similar manner as described above in connection with FIG. 11. As an example, the server 130 may process the tile pyramid 1460 and the tile pyramid 1470 in serial.

Figure 15:
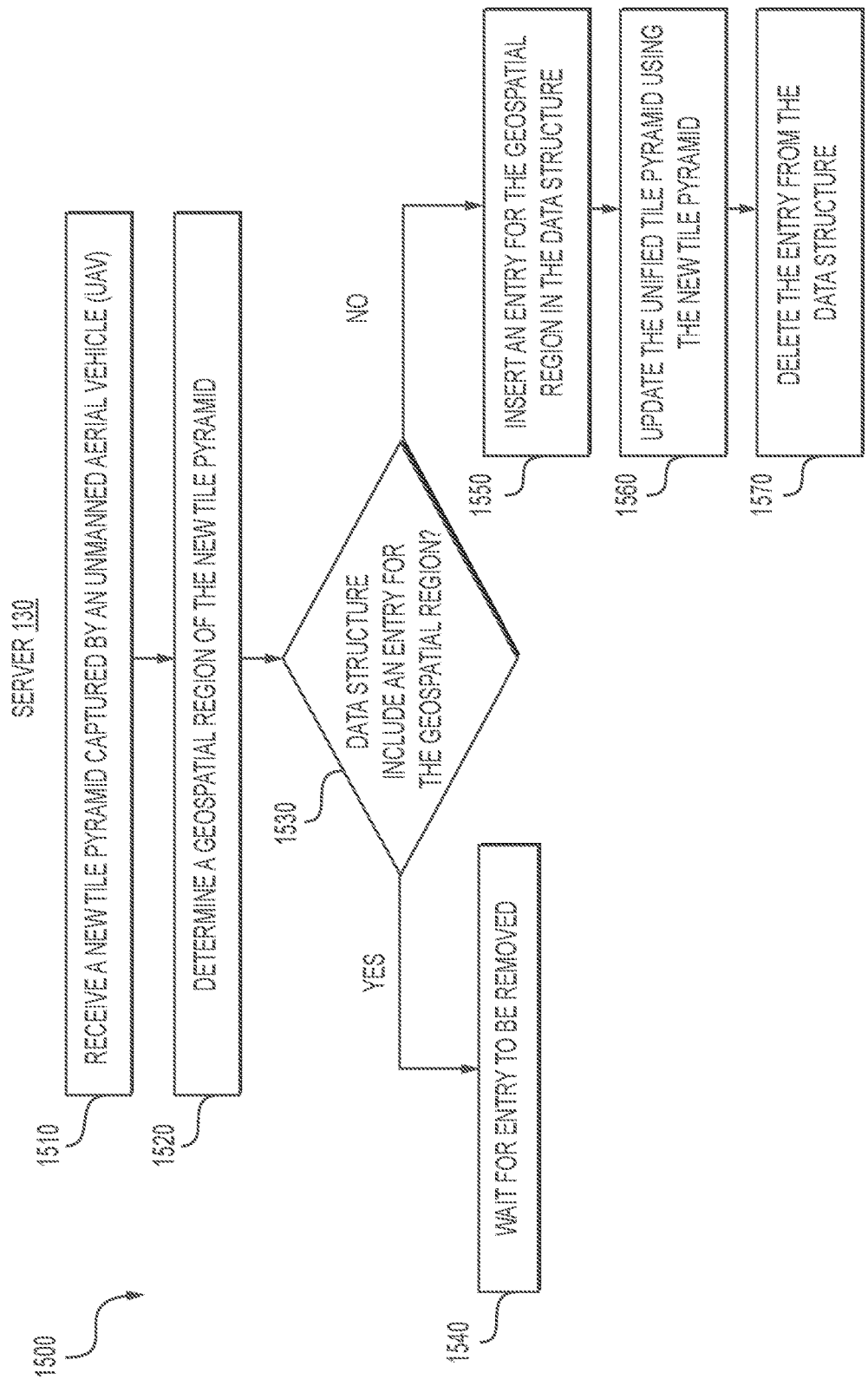
FIG. 15 is a flowchart of an example process 1500 for updating a unified tile pyramid using a concurrency control mechanism.
Figure 16:
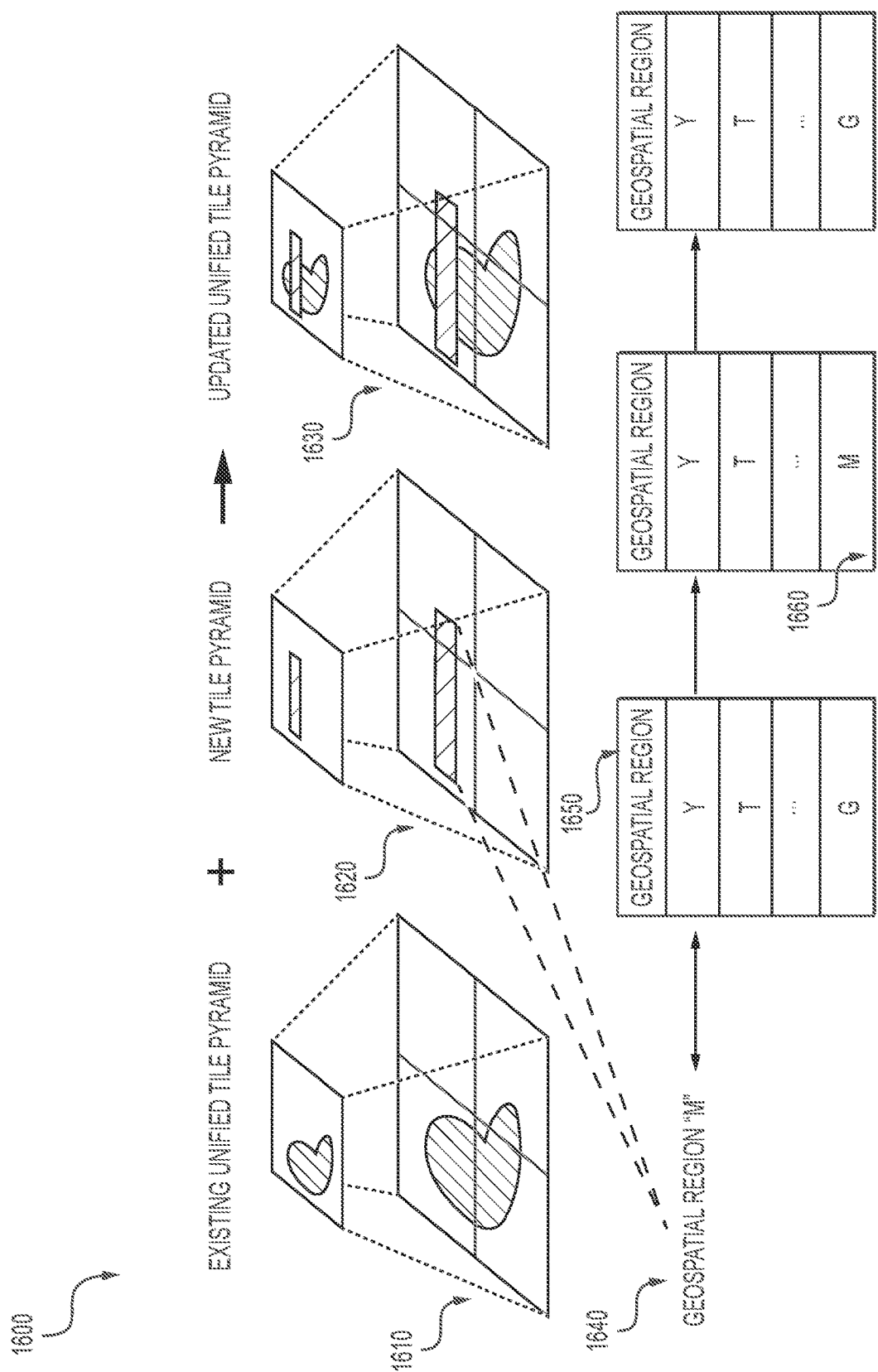
FIG. 16 is a diagram of an example process 1600 for updating a unified tile pyramid using a concurrency control mechanism.

FIG. 15 is a flowchart of an example process 1500 for updating a unified tile pyramid using a concurrency control mechanism. FIG. 16 is a diagram of an example process 1600 for updating a unified tile pyramid using a concurrency control mechanism.

An entity may include a multitude of UAVs 120, and may desire to capture and process myriad orthomosaics concurrently. In some cases, the server 130 may attempt to run multiple jobs to modify the unified tile pyramid using two overlapping orthomosaics concurrently. In this case, errors and artifacts may be introduced because multiple spatially overlapping tile pyramids might be processed concurrently.

Accordingly, the present disclosure provides a mechanism by which the server 130 utilizes a concurrency control mechanism to prevent multiple overlapping tile pyramids from being processed concurrently.

As shown in FIG. 15, the server 130 may receive a new tile pyramid captured by a UAV (operation 1510). For example, the server 130 may receive a new tile pyramid in a similar manner as described above in connection with FIG. 3. As an example, and as shown in FIG. 16, the server 130 may receive a new tile pyramid 1620.

As further shown in FIG. 15, the server 130 may determine a geospatial region of the new tile pyramid (operation 1520). For example, the server 130 may determine a geospatial region that corresponds to the new tile pyramid. As an example, as shown in FIG. 16, the server 130 may determine a geospatial region "M" that corresponds to the new tile pyramid. In other words, the server 130 may determine a geospatial region that corresponds to the region of interest included in images of the new tile pyramid.

As further shown in FIG. 15, the server 130 may determine whether a data structure includes an entry for the geospatial region (operation 1530). For example, the server 130 may determine whether a data structure includes an entry that identifies the same geospatial region of the new tile pyramid. As an example, and as shown in FIG. 16, the server 130 may determine whether a data structure 1650 includes an entry for the geospatial region "M." The data structure may include entries that identify spatial regions that include tile pyramids for which the unified tile pyramid is currently being updated. As an example, the data structure may be a semaphore, a table, a database, or the like. Based on the data structure, the server 130 may determine whether the unified tile pyramid is being updated with another tile pyramid corresponding to the geospatial region.

As further shown in FIG. 15, if the data structure does include an entry for the geospatial region (operation 1530—YES), then the server 130 may wait for the entry to be removed (operation 1540). For example, the server 130 may refrain from updating the unified tile pyramid with the new tile pyramid because another device, or process, is currently updating the unified tile pyramid with a tile pyramid corresponding to the geospatial region.

As further shown in FIG. 15, if the data structure does not include an entry for the geospatial region (operation 1530—NO), then the server 130 may insert an entry for the geospatial region in the data structure (operation 1550), update the unified tile pyramid using the new tile pyramid (operation 1560), and delete the entry from the data structure (operation 1570). For example, the server 130 may insert an entry for the geospatial region into the data structure, update the unified tile pyramid with the new tile pyramid, and delete the entry after updating the unified tile pyramid. As an example, as shown in FIG. 16, the server 130 may insert an entry 1660 ("M") into the data structure 1650, update the unified tile pyramid 1630 using the new tile pyramid 1620, and then remove the entry 1660 from the data structure 1650 after updating the unified tile pyramid 1630.

In this way, the server 130 may utilize the concurrency control mechanism to reduce errors and artifacts that may be introduced by concurrently processing multiple spatially overlapping tile pyramids.

Figure 17:
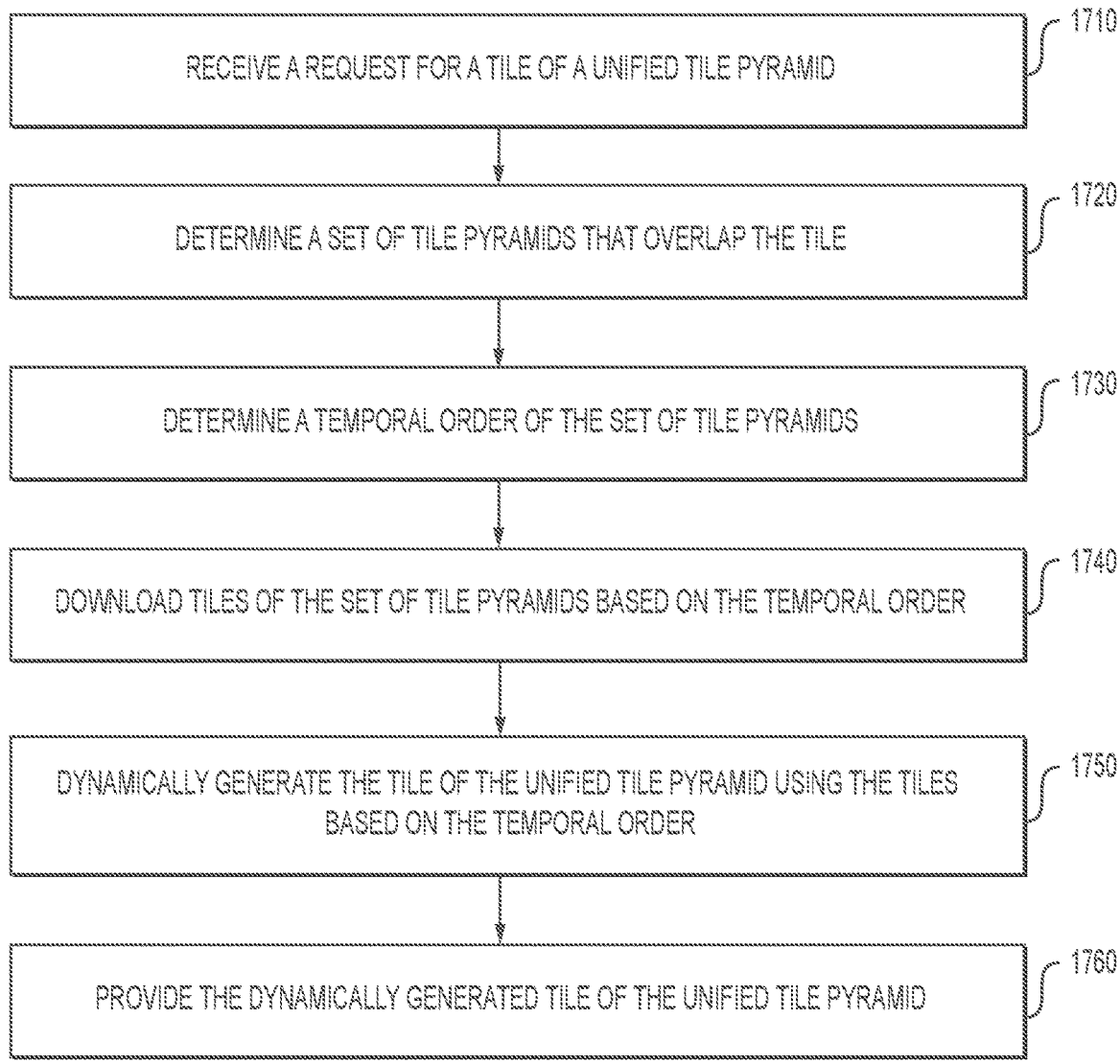
FIG. 17 is a flowchart of an example process 1700 for dynamically generating a unified tile pyramid.
Figure 18:
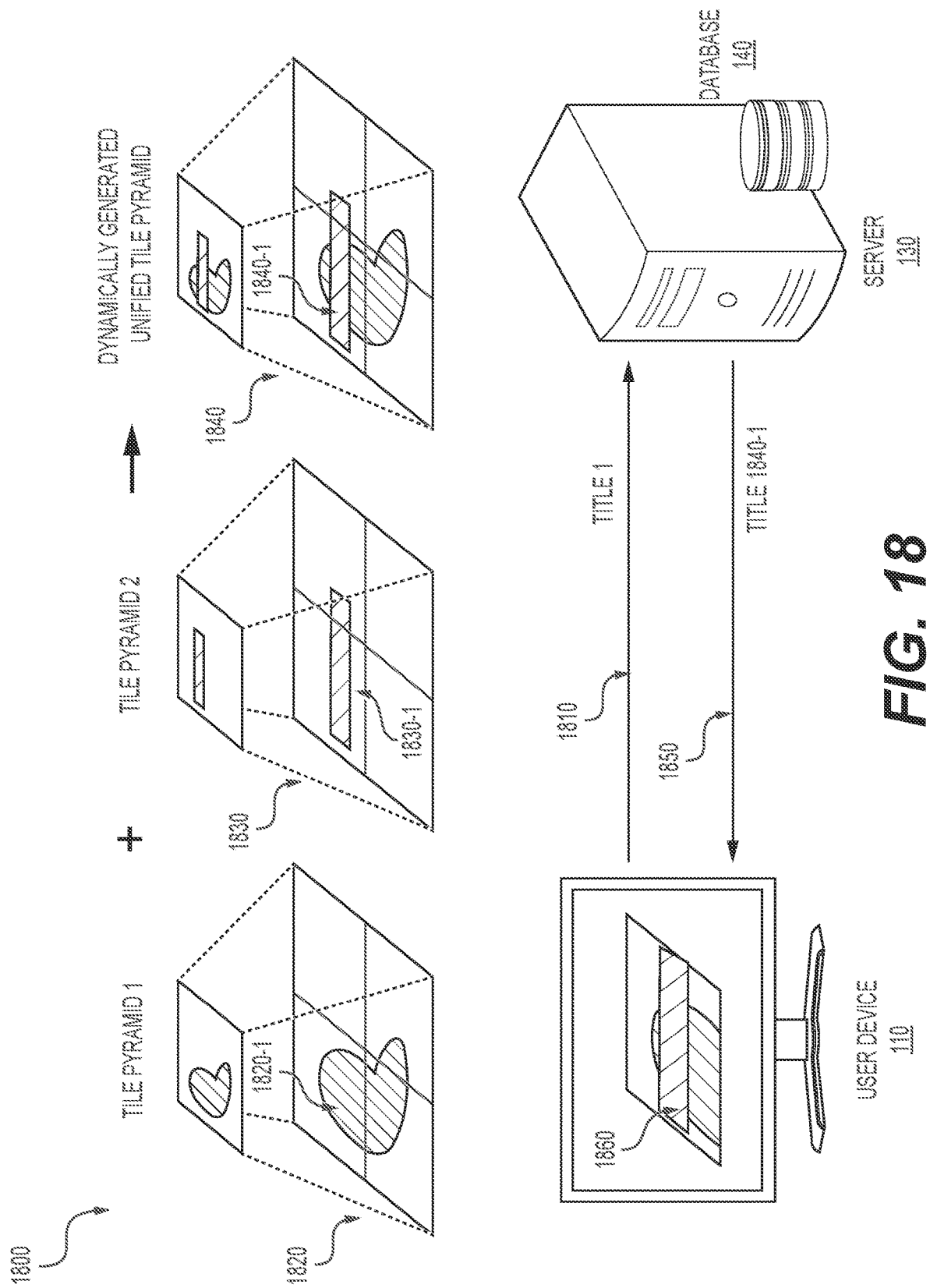
FIG. 18 is a diagram of an example process 1800 for dynamically generating a unified tile pyramid.

FIG. 17 is a flowchart of an example process 1700 for dynamically generating a unified tile pyramid. FIG. 18 is a diagram of an example process 1800 for dynamically generating a unified tile pyramid.

In some situations, the tiles in the unified tile pyramid might be blended together when a new orthomosaic is processed. Thus, the unified tile pyramid may be materialized on cloud storage in the database 140 prior to being requested by a user device 110. In this case, a request for a particular tile involves transmitting the tile from the cloud storage of the database 140 to the user device 110.

With additional metadata about the geometry of each UAV 120 flight's tiles, the present disclosure provides a mechanism to dynamically render the tiles at the time when the request is received from the user device 110, rather than being materialized on bucket storage of the database 140 ahead of time.

In this case, dynamic rendering of the unified tile pyramid may refer to the tiles being blended together from their component tile pyramids at request time from the user device 110. Thus, the tiles of the unified tile pyramid might not be materialized on cloud storage of the database 140 before request time by the user device 110. In other words, the unified tile pyramid is a "view" created by dynamically combining many input tile pyramids in response to a request from the user device 110.

As shown in FIG. 17, the server 130 may receive a request for a tile of a unified tile pyramid (operation 1710). For example, the server 130 may receive the request from the user device 110 that is currently displaying tiles of a unified tile pyramid. As an example, the user device 110 may provide the request to the server 130 based on a user manipulating the view of the unified tile pyramid that is being displayed by the user device 110, in a similar manner as described above in connection with FIG. 5. As an example, and as shown by reference number 1810 of FIG. 18, the user device 110 may provide a request for a tile ("Tile 1") to the server 130.

As further shown in FIG. 17, the server 130 may determine a set of tile pyramids that overlap the tile (operation 1720). For example, the server 130 may determine a geospatial position of the tile requested by the user device 110, and identify one or more tile pyramids stored in the database 140 that include tiles that overlap the geospatial position. The server 130 may determine respective geospatial regions of the tile pyramids stored in the database 140. For example, the server 130 may determine respective geospatial regions of orthomosaics of the tile pyramids. The server 130 may determine the respective geospatial regions at a maximum level (or finest level) of the tile pyramids.

As an example, and as shown in FIG. 18, the server 130 may determine that a tile 1820-1 of a tile pyramid 1820 and a tile 1830-1 of a tile pyramid 1830 overlap the requested tile. In some implementations, the server 130 may determine a set of tile pyramids for which a user (or entity) of the user device 110 is authorized to view, and may determine the tile pyramids that overlap the tile from among the set of tile pyramids for which the user is authorized to view. In this case, different users (or accounts) of the user device 110 (or user devices 110) might view different rendered unified tile pyramids based on the particular authorizations of the users or accounts.

As further shown in FIG. 17, the server 130 may determine a temporal order of the set of tile pyramids (operation 1730). For example, the server 130 may determine temporal indicators of the tile pyramids, and determine a temporal order based on the temporal indicators. The server 130 may determine a subset of the set of tile pyramids based on the temporal order. For example, the server 130 may determine the n most recent tile pyramids from among m tile pyramids. As an example, and referring to FIG. 18, the server 130 may determine that the tile pyramid 1830 is more current than the tile pyramid 1820 based on respective temporal indicators of the tile pyramids 1820 and 1830. In this way, the user can view the imagery of more recent tile pyramids on top of less recent tile pyramids. In another implementation, the server 130 may determine particular tile pyramids belonging to a particular time frame selected by the user. For instance, the user might desire to view tile pyramids belonging to a particular time frame (e.g., 5 months ago, 2 years ago, etc.). In this case, the server 130 may determine tile pyramids belonging to the particular time frame. In this way, the user can view imagery of tile pyramids belonging to the desired time frame.

As further shown in FIG. 17, the server 130 may download tiles from the set of tile pyramids based on the temporal order (operation 1740). For example, the server 130 may download, from the database 140, tiles of the tile pyramids based on the temporal order. As an example, the server 130 may download tiles of the n most recent tile pyramids. As an example, and referring to FIG. 18, the server 130 may download, from the database 140, the tile 1820-1 and the tile 1830-1.

As further shown in FIG. 17, the server 130 may dynamically generate the tile of the unified pyramid using the tiles based on the temporal order (operation 1750). For example, the server 130 may generate a unified tile pyramid using the tiles in a similar manner as described above in connection with FIG. 7. As an example, and referring to FIG. 18, the server 130 may generate a tile 1840-1 based on the tile 1820-1 and the tile 1830-1. The server 130 may generate the tile based on the temporal order of the tiles by overlaying the tiles such that the more recent tiles occlude less recent tiles.

As further shown in FIG. 17, the server 130 may provide the dynamically generated tile of the unified tile pyramid (operation 1760). For example, the server 130 may provide the dynamically generated unified tile pyramid to the user device 110. The user device 110 may display the unified tile pyramid. As an example, and referring to FIG. 18, the server 130 may provide the tile 1840-1 to the user device 110, as shown by reference number 1850. Further, the user device 110 may display the tile 1840-1 as shown by reference number 1860.

In this way, the server 130 may dynamically generate and render the unified tile pyramid based on a request from the user device 110. In this case, the server 130 might not be required to generate the unified tile pyramid ahead of time.

The present disclosure provides systems and methods for generating and updating a unified tile pyramid. In this way, an entity may concurrently view some or all of the entity's orthomosaics in a single "view." As such, the entity may have a more cohesive and coherent understanding of the regions(s) of interest imaged by the orthomosaics. In this way, the present disclosure provides a technical improvement directed to the generation and display of tile pyramids.

Moreover, the present disclosure provides systems and methods for more efficiently and accurately generating and updating a unified tile pyramid. For example, the present disclosure provides a technique for more efficiently and selectively downloading existing tiles of an existing unified tile pyramid when generating an updated unified tile pyramid. In this way, the present disclosure provides a technical improvement directed to conserving processor and/or memory resources of the devices associated with updating the unified tile pyramid. As another example, the present disclosure provides a technique for concurrently processing multiple disjoint tile pyramids to generate a unified tile pyramid. In this way, the present disclosure provides a technical improvement directed to reducing the amount of time associated with generating a unified tile pyramid, while retaining accuracy of the unified tile pyramid generation. As another example, the present disclosure provides a concurrency control mechanism that reduces the number of instances in which overlapping tile pyramids are processed concurrently. In this way, the present disclosure provides a technical improvement directed to reducing the amount of time associated with generating a unified tile pyramid, while retaining accuracy of the unified tile pyramid generation.

Moreover, the present disclosure provides systems and methods for dynamically generating and rendering a unified tile pyramid. In this way, the present disclosure provides a technical improvement directed to unified tile pyramid generation by reducing the need for the unified tile pyramid to be generated prior to a request from a user device.

Although the present disclosure describes the generation of tile pyramids using constituent images, of orthomosaics, captured by a camera of a UAV, it should be understood that the embodiments herein are applicable to other types of tile pyramids generated using other types of images captured by other image sources. For example, the embodiments herein are applicable to images captured by cameras of other vehicles, such as autonomous vehicles, robots, cars, trains, planes, helicopters, spacecraft, satellites, etc. Moreover, the embodiments herein are applicable to images captured by cameras that are not provided on vehicles. Further still, the embodiments herein are applicable to images of any underlying object of interest. For example, the embodiments herein are applicable to satellite images, medical images, astronomical images, etc. In this way, it should be understood that the embodiments herein are applicable to all types of tile pyramids generated using any type of underlying images of any underlying object of interest captured by any type of camera.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

What is claimed is:

1. A method for dynamically generating a tile of a unified tile pyramid including a set of orthomosaics captured by one or more unmanned aerial vehicles (UAVs), the method comprising:
   receiving, by a server and from a user device, a request for the tile of the unified tile pyramid;
   determining, by the server, a set of tile pyramids, corresponding to the set of orthomosaics, that overlap the tile;
   determining, by the server, a temporal order of the set of tile pyramids;
   generating, by the server, the tile of the unified tile pyramid by blending tiles of the set of tile pyramids based on the temporal order; and
   providing, by the server and to the user device, the tile of the unified tile pyramid, wherein the user device is configured to display the tile based on receiving the tile from the server.

2. The method of claim 1, further comprising:
   determining, by the server, a temporal order of the set of tile pyramids; and
   downloading, by the server and from a database, tiles from a subset of the set of tile pyramids, based on the temporal order,
   wherein the generating, by the server, the tile of the unified tile pyramid comprises generating, by the server, the tile of the unified tile pyramid using the tiles from the subset of the set of tile pyramids.

3. The method of claim 1, further comprising:
   determining, by the server, a geospatial region of the tile,
   wherein the determining, by the server, the set of tile pyramids that overlap the tile comprises determining, by the server, the set of tile pyramids that overlap the tile based on the geospatial region of the tile and respective geospatial regions of the set of tile pyramids.

4. The method of claim 3, further comprising:
determining, by the server, the respective geospatial regions of the set of tile pyramids at a maximum level of the set of tile pyramids.

5. The method of claim 1, further comprising:
determining, by the server, tile pyramids for which the user device is authorized to access,
wherein the determining, by the server, the set of tile pyramids that overlap the tile comprises determining, by the server, the set of tile pyramids that overlap the tile based on determining the tile pyramids for which the user device is authorized to access.

6. The method of claim 1, wherein the unified tile pyramid includes the set of tile pyramids which respectively correspond to the set of orthomosaics of a region of interest captured by the one or more UAVs, and
wherein the region of interest overlaps a geospatial region corresponding to the tile.

7. A device for dynamically generating a tile of a unified tile pyramid including a set of orthomosaics captured by one or more unmanned aerial vehicles (UAVs), the device comprising:
a memory configured to store instructions; and
a processor configured to execute the instructions to perform operations comprising:
receiving, from a user device, a request for the tile of the unified tile pyramid;
determining a set of tile pyramids, corresponding to the set of orthomosaics, that overlap the tile;
determining a temporal order of the set of tile pyramids;
generating the tile of the unified tile pyramid by blending tiles of the set of tile pyramids based on the temporal order; and
providing, to the user device, the tile of the unified tile pyramid, wherein the user device is configured to display the tile based on receiving the tile from the device.

8. The device of claim 7, wherein the operations further comprise:
determining a temporal order of the set of tile pyramids; and
downloading, from a database, tiles from a subset of the set of tile pyramids, based on the temporal order,
wherein the generating the tile of the unified tile pyramid comprises generating the tile of the unified tile pyramid using the tiles from the subset of the set of tile pyramids.

9. The device of claim 7, wherein the operations further comprise:
determining a geospatial region of the tile,
wherein the determining the set of tile pyramids that overlap the tile comprises determining the set of tile pyramids that overlap the tile based on the geospatial region of the tile and respective geospatial regions of the set of tile pyramids.

10. The device of claim 9, wherein the operations further comprise:
determining the respective geospatial regions of the set of tile pyramids at a maximum level of the set of tile pyramids.

11. The device of claim 7, wherein the operations further comprise:
determining tile pyramids for which the user device is authorized to access,
wherein the determining the set of tile pyramids that overlap the tile comprises determining the set of tile pyramids that overlap the tile based on determining the tile pyramids for which the user device is authorized to access.

12. The device of claim 7, wherein the unified tile pyramid includes the set of tile pyramids which respectively correspond to the set of orthomosaics of a region of interest captured by the one or more UAVs, and
wherein the region of interest overlaps a geospatial region corresponding to the tile.

13. A non-transitory computer-readable medium storing instructions that, when executed by a processor for dynamically generating a tile of a unified tile pyramid including a set of orthomosaics captured by one or more unmanned aerial vehicles (UAVs), cause the processor to perform operations comprising:
receiving, from a user device, a request for the tile of the unified tile pyramid;
determining a set of tile pyramids, corresponding to the set of orthomosaics, that overlap the tile;
determining a temporal order of the set of tile pyramids;
generating the tile of the unified tile pyramid by blending tiles of the set of tile pyramids based on the temporal order; and
providing, to the user device, the tile of the unified tile pyramid, wherein the user device is configured to display the tile based on receiving the tile from the device.

14. The non-transitory computer-readable medium of claim 13, wherein the operations further comprise:
determining a temporal order of the set of tile pyramids; and
downloading, from a database, tiles from a subset of the set of tile pyramids, based on the temporal order,
wherein the generating the tile of the unified tile pyramid comprises generating the tile of the unified tile pyramid using the tiles from the subset of the set of tile pyramids.

15. The non-transitory computer-readable medium of claim 13, wherein the operations further comprise:
determining a geospatial region of the tile,
wherein the determining the set of tile pyramids that overlap the tile comprises determining the set of tile pyramids that overlap the tile based on the geospatial region of the tile and respective geospatial regions of the set of tile pyramids.

16. The non-transitory computer-readable medium of claim 13, wherein the operations further comprise:
determining tile pyramids for which the user device is authorized to access,
wherein the determining the set of tile pyramids that overlap the tile comprises determining the set of tile pyramids that overlap the tile based on determining the tile pyramids for which the user device is authorized to access.

17. The non-transitory computer-readable medium of claim 13, wherein the unified tile pyramid includes the set of tile pyramids which respectively correspond to the set of orthomosaics of a region of interest captured by the one or more UAVs, and
wherein the region of interest overlaps a geospatial region corresponding to the tile.

* * * * *